(12) United States Patent
Kumarasamy et al.

(10) Patent No.: US 9,461,881 B2
(45) Date of Patent: Oct. 4, 2016

(54) MIGRATION OF EXISTING COMPUTING SYSTEMS TO CLOUD COMPUTING SITES OR VIRTUAL MACHINES

(71) Applicant: CommVault Systems, Inc., Oceanport, NJ (US)

(72) Inventors: Paramasivam Kumarasamy, Morganville, NJ (US); Amit Mitkar, Neptune, NJ (US); Sumedh P. Degaonkar, Ocean City, NJ (US); Rahul S. Pawar, Marlboro, NJ (US); Sri Karthik Bhagi, Hyderabad (IN)

(73) Assignee: Commvault Systems, Inc., Tinton Falls, NJ (US)

( * ) Notice: Subject to any disclaimer, the term of this patent is extended or adjusted under 35 U.S.C. 154(b) by 564 days.

(21) Appl. No.: 13/790,028

(22) Filed: Mar. 8, 2013

(65) Prior Publication Data

US 2013/0262390 A1    Oct. 3, 2013

Related U.S. Application Data

(60) Provisional application No. 61/618,677, filed on Mar. 31, 2012, provisional application No. 61/618,685, filed on Mar. 31, 2012.

(51) Int. Cl.
*G06F 17/30* (2006.01)
*H04L 12/24* (2006.01)
*G06F 9/48* (2006.01)
(Continued)

(52) U.S. Cl.
CPC .............. *H04L 41/08* (2013.01); *G06F 9/4856* (2013.01); *G06F 9/5077* (2013.01); *H04L 41/0846* (2013.01); *H04L 41/0863* (2013.01); *G06F 11/1446* (2013.01); *G06F 2009/4557* (2013.01)

(58) Field of Classification Search
CPC .................... G06F 2009/4557; H04L 67/1097
See application file for complete search history.

(56) References Cited

U.S. PATENT DOCUMENTS

| | | | |
|---|---|---|---|
| 4,686,620 | A | 8/1987 | Ng |
| 4,995,035 | A | 2/1991 | Cole et al. |

(Continued)

FOREIGN PATENT DOCUMENTS

| | | |
|---|---|---|
| EP | 0259912 A1 | 3/1988 |
| EP | 0405926 A2 | 1/1991 |

(Continued)

OTHER PUBLICATIONS

U.S. Appl. No. 13/765,389, filed Feb. 12, 2013, Kripalani.
(Continued)

*Primary Examiner* — Aleksandr Kerzhner
*Assistant Examiner* — Michael K Tamaru
(74) *Attorney, Agent, or Firm* — Perkins Coie LLP

(57) ABSTRACT

Software, firmware, and systems are described herein that migrate functionality of a source physical computing device to a destination virtual machine. A non-production copy of data associated with a source physical computing device is created. A configuration of the source physical computing device is determined. A configuration for a destination virtual machine is determined based at least in part on the configuration of the source physical computing device. The destination virtual machine is provided access to data and metadata associated with the source physical computing device using the non-production copy of data associated with the source physical computing device.

18 Claims, 12 Drawing Sheets

(51) Int. Cl.
*G06F 9/50* (2006.01)
*G06F 11/14* (2006.01)
*G06F 9/455* (2006.01)

(56) References Cited

U.S. PATENT DOCUMENTS

| | | | |
|---|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,581,076 B1 | 6/2003 | Ching et al. |
| 6,658,526 B2 | 12/2003 | Nguyen et al. |
| 7,035,880 B1 | 4/2006 | Crescenti et al. |
| 7,076,270 B2 | 7/2006 | Jaggers et al. |
| 7,219,162 B2 | 5/2007 | Donker et al. |
| 7,246,207 B2 | 7/2007 | Kottomtharayil et al. |
| 7,395,282 B1 | 7/2008 | Crescenti et al. |
| 7,448,079 B2 | 11/2008 | Tremain |
| 7,631,351 B2 | 12/2009 | Erofeev |
| 7,730,035 B2 | 6/2010 | Berger et al. |
| 7,756,835 B2 | 7/2010 | Pugh |
| 7,756,964 B2 | 7/2010 | Madison, Jr. et al. |
| 7,840,537 B2 | 11/2010 | Gokhale et al. |
| 7,882,077 B2 | 2/2011 | Gokhale et al. |
| 7,899,788 B2 | 3/2011 | Chandhok et al. |
| 7,937,421 B2 | 5/2011 | Mikesell et al. |
| 8,069,271 B2 | 11/2011 | Brunet et al. |
| 8,140,786 B2 | 3/2012 | Bunte et al. |
| 8,219,524 B2 | 7/2012 | Gokhale |
| 8,307,177 B2 | 11/2012 | Prahlad et al. |
| 2004/0049553 A1* | 3/2004 | Iwamura ............... G06F 3/0605 709/213 |
| 2006/0224846 A1 | 10/2006 | Amarendran et al. |
| 2007/0203938 A1 | 8/2007 | Prahlad et al. |
| 2007/0234302 A1 | 10/2007 | Suzuki et al. |
| 2008/0235479 A1* | 9/2008 | Scales et al. ................. 711/166 |
| 2008/0244177 A1 | 10/2008 | Crescenti et al. |
| 2009/0144416 A1 | 6/2009 | Chatley et al. |
| 2009/0157882 A1* | 6/2009 | Kashyap ....................... 709/227 |
| 2009/0319534 A1 | 12/2009 | Gokhale |
| 2009/0327471 A1 | 12/2009 | Astete et al. |
| 2010/0070725 A1 | 3/2010 | Prahlad et al. |
| 2010/0094948 A1* | 4/2010 | Ganesh et al. ............... 709/212 |
| 2010/0242096 A1 | 9/2010 | Varadharajan et al. |
| 2010/0332454 A1 | 12/2010 | Prahlad et al. |
| 2011/0035620 A1* | 2/2011 | Elyashev et al. ................. 714/4 |
| 2011/0087632 A1 | 4/2011 | Subramanian et al. |
| 2011/0093471 A1 | 4/2011 | Brockway et al. |
| 2011/0208928 A1* | 8/2011 | Chandra et al. ............. 711/162 |
| 2012/0017027 A1* | 1/2012 | Baskakov et al. ................. 711/6 |
| 2012/0084262 A1 | 4/2012 | Dwarampudi et al. |
| 2012/0254364 A1 | 10/2012 | Vijayan |
| 2013/0061014 A1 | 3/2013 | Prahlad et al. |
| 2013/0074181 A1* | 3/2013 | Singh .............................. 726/22 |
| 2013/0086580 A1* | 4/2013 | Simonsen et al. ................. 718/1 |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |

OTHER PUBLICATIONS

U.S. Appl. No. 13/789,871, filed Mar. 8, 2013, Kumarasamy et al.
U.S. Appl. No. 13/790,226, filed Mar. 8, 2013, Sancheti et al.
U.S. Appl. No. 13/926,332, filed Jun. 25, 2013, Dwarampudi et al.
Armstead et al., "Implementation of a Campus-wide Distributed Mass Storage Service: The Dream vs. Reality," *IEEE*, Sep. 11-14, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Brandon, J., "Virtualization Shakes Up Backup Strategy," <http://www.computerworld.com>, internet accessed on Mar. 6, 2008, 3 pages.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

(56) References Cited

OTHER PUBLICATIONS

CommVault Systems, Inc., "A CommVault White Paper: VMware Consolidated Backup (VCB) Certification Information Kit," 2007, 23 pages.
CommVault Systems, Inc., "CommVault Solutions—VMware," <http://www.commvault.com/solutions/vmware/>, internet accessed Mar. 24, 2008, 2 pages.
CommVault Systems, Inc., "Enhanced Protection and Manageability of Virtual Servers," Partner Solution Brief, 2008, 6 pages.
Davis, D., "3 VMware Consolidated Backup (VCB) Utilities You Should Know," Petri IT Knowlegebase, <http://www.petri.co.il/vmware-consolidated-backup-utilities.htm>, internet accessed on Jul. 14, 2008, 7 pages.
Davis, D., "Understanding VMware VMX Configuration Files," Petri IT Knowledgebase, <http://www.petri.co.il/virtual_vmware_vmx_configuration_files.htm>, internet accessed on Jun. 19, 2008, 6 pages.
Davis, D., "VMware Server & Workstation Disk Files Explained," Petri IT Knowledgebase, <http://www.petri.co.il/virtual_vmware_files_explained.htm>, internet accessed on Jun. 19, 2008, 5 pages.
Davis, D., "VMware Versions Compared," Petri IT Knowledgebase, <http://www.petri.co.il/virtual_vmware_versions_compared.htm>, internet accessed on Apr. 28, 2008, 6 pages.
Eitel, "Backup and Storage Management in Distributed Heterogeneous Environments," *IEEE*, Jun. 12-16, 1994, pp. 124-126.
International Preliminary Report on Patentability and Written Opinion for PCT/US2011/054374, dated Apr. 11, 2013, 6 pages.
Jander, M., "Launching Storage-Area Net," *Data Communications*, US, McGraw Hill, NY, vol. 27, No. 4 (Mar. 21, 1998), pp. 64-72.
Jason Gait, "The Optical File Cabinet: A Random-Access File System for Write-Once Optical Disks," *IEEE Computer*, vol. 21, No. 6, pp. 11-22 (Jun. 1988).
Microsoft Corporation, "How NTFS Works," Windows Server TechCenter, updated Mar. 28, 2003, internet accessed Mar. 26, 2008, 26 pages.
Rosenblum et al., "The Design and Implementation of a Log-Structured File System," *Operating Systems Review SIGOPS*, vol. 25, No. 5, New York, US, pp. 1-15 (May 1991).
Sanbarrow.com, "Disktype-table," <http://sanbarrow.com/vmdk/disktypes.html>, internet accessed on Jul. 22, 2008, 4 pages.
Sanbarrow.com, "Files Used by a VM," <http://sanbarrow.com/vmx/vmx-files-used-by-a-vm.html>, internet accessed on Jul. 22, 2008, 2 pages.
Sanbarrow.com, "Monolithic Versus Split Disks," <http://sanbarrow.com/vmdk/monolithicversusspllit.html>, internet accessed on Jul. 14, 2008, 2 pages.
VMware, Inc., "Open Virtual Machine Format," <http://www.vmware.com/appliances/learn/ovf.html>, internet accessed on May 6, 2008, 2 pages.
VMware, Inc., "OVF, Open Virtual Machine Format Specification, version 0.9," White Paper, <http://www.vmware.com>, 2007, 50 pages.
VMware, Inc., "The Open Virtual Machine Format Whitepaper for OVF Specification, version 0.9," White Paper, <http://www.vmware.com>, 2007, 16 pages.
VMware, Inc., "Understanding VMware Consolidated Backup," White Paper, <http://www.vmware.com>, 2007, 11 pages.
VMware, Inc., "Using VMware Infrastructure for Backup and Restore," Best Practices, <http://www.vmware.com>, 2006, 20 pages.
VMware, Inc., "Virtual Disk API Programming Guide," <http://www.vmware.com>, Revision 20080411, 2008, 44 pages.
VMware, Inc., "Virtual Disk Format 1.1," VMware Technical Note, <http://www.vmware.com>, Revision 20071113, Version 1.1, 2007, 18 pages.
VMware, Inc., "Virtual Machine Backup Guide, ESX Server 3.0.1 and VirtualCenter 2.0.1," <http://www.vmware.com>, updated Nov. 21, 2007, 74 pages.
VMware, Inc., "Virtual Machine Backup Guide, ESX Server 3.5, ESX Server 3i version 3.5, VirtualCenter 2.5," <http://www.vmware.com>, updated Feb. 21, 2008, 78 pages.
VMware, Inc., "Virtualized iSCSI SANS: Flexible, Scalable Enterprise Storage for Virtual Infrastructures," White Paper, <http://www.vmware.com>, Mar. 2008, 13 pages.
VMware, Inc., "VMware Consolidated Backup, Improvements in Version 3.5," Information Guide, <http://www.vmware.com>, 2007, 11 pages.
VMware, Inc., "VMware Consolidated Backup," Product Datasheet, <http://www.vmware.com>, 2007, 2 pages.
VMware, Inc., "VMware ESX 3.5," Product Datasheet, <http://www.vmware.com>, 2008, 4 pages.
VMware, Inc., "VMware GSX Server 3.2, Disk Types: Virtual and Physical," <http://www.vmware.com/support/gsx3/doc/disks_types_gsx.html>, internet accessed on Mar. 25, 2008, 2 pages.
VMware, Inc., "VMware OVF Tool," Technical Note, <http://www.vmware.com>, 2007, 4 pages.
VMware, Inc., "VMware Workstation 5.0, Snapshots in a Linear Process," <http:/www.vmware.com/support/ws5/doc/ws_preserve_sshot_linear.html>, internet accessed on Mar. 25, 2008, 1 page.
VMware, Inc., "VMware Workstation 5.0, Snapshots in a Process Tree," <http://www.vmware.com/support/ws5/doc/ws_preserve_sshot_tree.html>, internet accessed on Mar. 25, 2008, 1 page.
VMware, Inc., "VMware Workstation 5.5, What Files Make Up a Virtual Machine?" <http://www.vmware.com/support/ws55/doc/ws_learning_files_in_a_vm.html>, internet accessed on Mar. 25, 2008, 2 pages.
Wikipedia, "Cluster (file system)," <http://en.wikipedia.org/wiki/Cluster_%28file_system%29>, internet accessed Jul. 25, 2008, 1 page.
Wikipedia, "Cylinder-head-sector," <http://en.wikipedia.org/wiki/Cylinder-head-sector>, internet accessed Jul. 22, 2008, 6 pages.
Wikipedia, "File Allocation Table," <http://en.wikipedia.org/wiki/File_Allocation_Table>, internet accessed on Jul. 25, 2008, 19 pages.
Wikipedia, "Logical Disk Manager," <http://en.wikipedia.org/wiki/Logical_Disk_Manager>, internet accessed Mar. 26, 2008, 3 pages.
Wikipedia, "Logical Volume Management," <http://en.wikipedia.org/wiki/Logical_volume_management>, internet accessed on Mar. 26, 2008, 5 pages.
Wikipedia, "Storage Area Network," <http://en.wikipedia.org/wiki/Storage_area_network>, internet accessed on Oct. 24, 2008, 5 pages.
Wikipedia, "Virtualization," <http://en.wikipedia.org/wiki/Virtualization>, internet accessed Mar. 18, 2008, 7 pages.
Commvault, "Automatic File System Multi-Streaming," http://documentation.commvault.com/hds/release_7_0_0/books_online_1/english_us/feature, downloaded Jun. 4, 2015, 4 pages.
Hitachi, "Create a Virtual Machine—VM Lifecycle Management—Vmware," http://documentation.commvault.com/hds/v10/article?p=-products/vs vmware/vm provisio . . . , downloaded Apr. 28, 2015, 2 pages.
Hitachi, "Frequently Asked Questions—Virtual Server Agent for Vmware," http://documentation.commvault.com/hds/v10/article?p=products/vs vmware/faqs.htm, downloaded Apr. 28, 2015, 11 pages.
Hitachi, "Overview—Virtual Server Agent for VMware," http://documentation.commvault.com/hds,v1 0/artide?p=products/vs vmware/overview.htm, downloaded Apr. 28, 2015, 3 pages.
Hitachi, "Recover Virtual Machines or VM Files—Web Console," http://documentation.commvault.com/hds/v10/article?p+products/vs vmware/vm archivin . . . , downloaded Apr. 28, 2015, 2 pages.

\* cited by examiner

MIGRATION OF EXISTING COMPUTING SYSTEMS TO CLOUD COMPUTING SITES OR VIRTUAL MACHINES

CROSS-REFERENCE TO RELATED APPLICATION(S)

The present application claims priority to and the benefit of U.S. Provisional Application Nos. 61/618,677 and 61/618,685, both filed Mar. 31, 2012, which are hereby incorporated herein by reference in their entirety.

This application is related to assignee's U.S. patent application Ser. No. 13/250,962, filed on Sep. 30, 2011, entitled "EFFICIENT DATA MANAGEMENT IMPROVEMENTS, SUCH AS DOCKING LIMITED-FEATURE DATA MANAGEMENT MODULES TO A FULL-FEATURED DATA MANAGEMENT SYSTEM", and U.S. Provisional Patent Application 61/618,579, entitled DATA STORAGE RECOVERY AUTOMATION, filed Mar. 30, 2012, both of which are hereby incorporated by reference herein in their entirety.

BACKGROUND

Companies have the opportunity to reduce the complexity of their IT infrastructure and their IT costs by using virtualization technologies and cloud computing services. In general, virtualization refers to the simultaneous hosting of one or more operating systems on a physical computer. Such virtual operating systems and their associated virtual resources are called virtual machines. Virtualization software (or synonymously, a hypervisor or Virtual Machine Monitor), sits between the virtual machines and the hardware of the physical computer, which is called a virtual machine host. One example of virtualization software is ESX Server, by VMware, Inc. of Palo Alto, Calif. Other examples include Microsoft Virtual Server and Microsoft Windows Server Hyper-V, both by Microsoft Corporation of Redmond, Wash., and Sun xVM by Oracle America Inc. of Santa Clara, Calif.

Virtualization software provides to each virtual operating system virtual resources, such as virtual processors, virtual memory, virtual network devices, and virtual disks. Each virtual machine has one or more virtual disks to store the files, metadata, and other data used by the virtual machine. Virtualization software typically stores the data of virtual disks in files on the file system of the physical computer, called virtual machine disk files (in the case of VMware virtual servers) or virtual hard disk image files (in the case of Microsoft virtual servers). For example, VMware's ESX Server provides the Virtual Machine File System (VMFS) for managing virtual machine disk files. A virtual machine reads data from and writes data to its virtual disk much the same way that an actual physical machine reads data from and writes data to an actual disk.

Cloud computing services (or "cloud services") provide computing as a service by sharing resources and software to computing devices over a network such as the Internet, typically as a paid (e.g., metered or subscription) service. For example, cloud services provide storage resources, computational power, software, and data access to their customers, who are generally unaware of the underlying structure of the physical devices and software that facilitate the services. Examples of cloud computing service vendors include Amazon Corporation of Seattle, Wash. (offering Amazon Web Services); Rackspace Corporation of San Antonio, Tex.; and Microsoft Corporation of Redmond, Wash. (offering Windows Azure).

A cloud service often provides an Application Programming Interface ("API") or similar interface that enables a cloud service customer's machines to access, modify, and otherwise manage the customer's cloud services and data. Typically, cloud services are facilitated by virtualization. For example, in order to provide data storage, access, and computational resources for customers, a cloud service provider may operate a data center having multiple virtual machine hosts, each of which runs multiple virtual machines.

When companies transition their existing in-house physical IT infrastructure, such as existing application servers, to virtual machines and cloud services, they may experience numerous difficulties. For example, the company's IT staff may be unfamiliar with virtualization software or cloud service APIs and therefore spend substantial internal resources familiarizing themselves with these. Alternatively, a company's IT staff may be familiar with using only a single virtualization or cloud computing service vendor and therefore miss the opportunity to transition to a different, more cost-effective vendor. The internal IT staff may also incorrectly transition existing application servers or stored data to a new virtualized or cloud platform. Moreover, even if IT staff are familiar with numerous virtualization and cloud service vendors, they may need to spend substantial time and energy cataloguing existing physical IT resources, designing and deploying comparable virtualization or cloud services platforms to replace those physical resources, porting existing applications to the new platforms, testing the new platforms, and redirecting client service requests to the new platforms.

Some systems and software may convert a physical machine to a virtual machine. However, typically such systems and software require that all of the production data of the physical machine be read and transmitted over a network, which requires substantial time and network bandwidth. These systems and software also typically require that the same data be stored twice: once at the source physical machine and once at the destination virtual machine. Moreover, such systems and software typically must perform substantial processing to convert the production data of the physical machine to a virtual disk file (e.g., a .vmdk file). Further, such systems and software typically cannot create a virtual machine from an earlier, point-in-time state of the physical machine, but can only create a virtual machine reflecting the state of the physical machine at the present time when the virtual machine is being created.

The need exists for systems and methods that overcome the above problems, as well as systems and methods that provide additional benefits. Overall, the examples herein of some prior or related systems and methods and their associated limitations are intended to be illustrative and not exclusive. Other limitations of existing or prior systems and methods will become apparent to those of skill in the art upon reading the following Detailed Description.

DETAILED DESCRIPTION

Figure 1A:
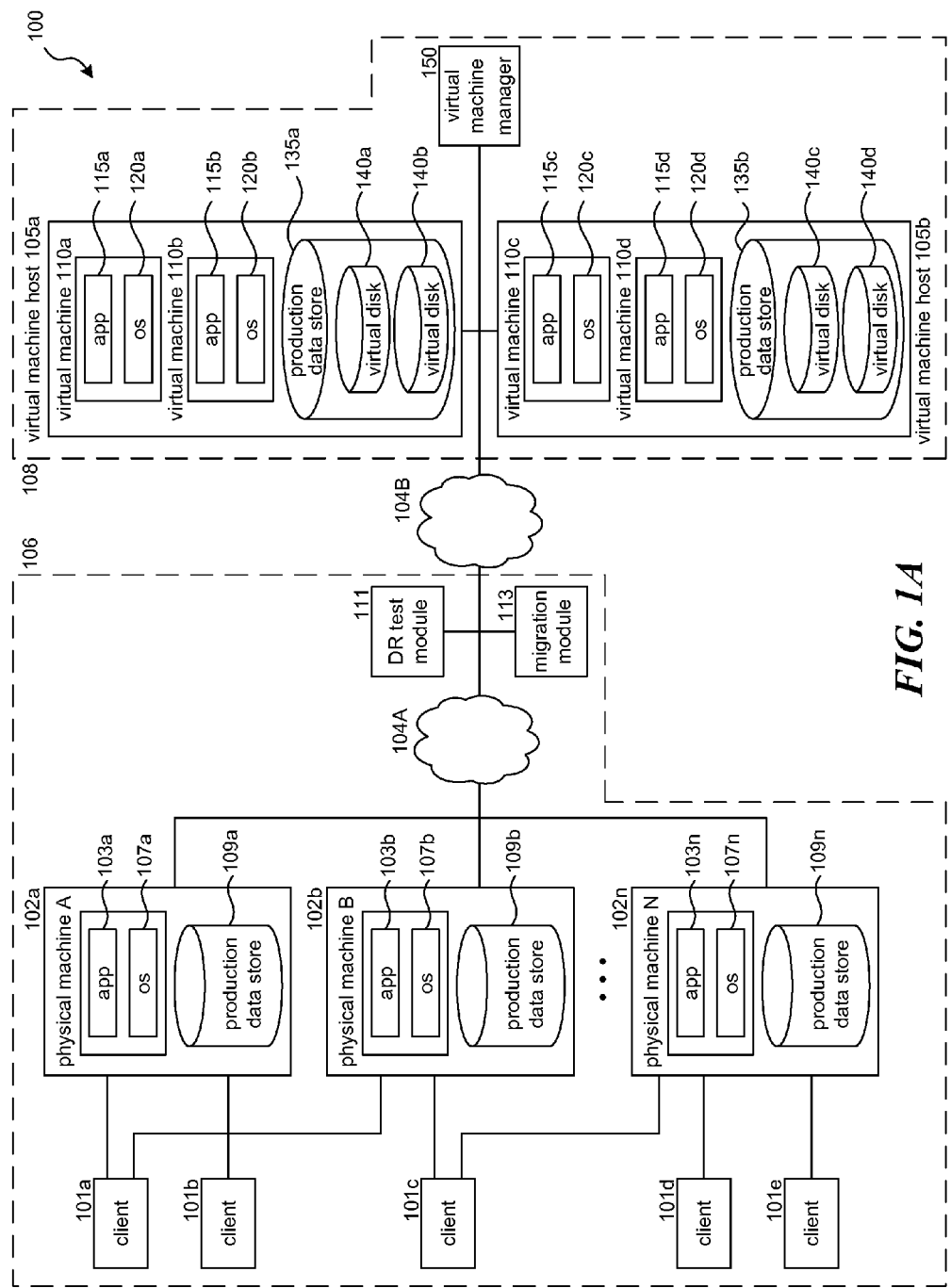
FIG. 1A is a block diagram illustrating an environment in which a system for migrating physical computing resources operates.

The headings provided herein are for convenience only and do not necessarily affect the scope or meaning of the disclosure.

Overview

A software, firmware, and/or hardware system for migrating a physical machine to a virtual machine (the "system") is disclosed. The system receives a request to clone physical machine functionality on a new virtual machine. In response, the system creates or identifies a non-production, point-in-time copy of the data and metadata from the physical machine, such as a snapshot copy. Using the non-production copy of the data and any applicable policies, the system can automatically detect the configuration and resource usage of the physical machine and determine a desired configuration and location of the new virtual machine. The system then provisions a new virtual machine at the determined location, adjusts its configuration to match the desired configuration, and makes data and metadata from the physical machine available to the virtual machine. Once the virtual machine has thus been created and configured, it may be used for disaster recovery purposes or to replace the physical machine. In some examples, the non-production copy of the data is a snapshot copy and the data and metadata from the physical machine is made available by exposing a production data store associated with the physical machine or a replica of the production data store to the virtual machine.

Other migration methods are also described herein, including methods for migrating a source physical machine to another destination physical machine, migrating a source virtual machine to another destination virtual machine, and migrating a virtual machine to a physical machine.

Also described herein are systems and methods for creating one or more additional non-production copies of a virtual machine's data and metadata from snapshots, using snapshots to revert a virtual machine having a physical compatibility mode raw device mapped LUN (or "PRDM-mapped LUN") (or another type of mapped external LUN or device) to an earlier point in time, and using non-production copies other than snapshots to restore a virtual machine that has a PRDM-mapped LUN (or another type of mapped external LUN or device).

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention may include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Illustrative Environments

FIG. 1A is a block diagram illustrating an environment 100 in which a system for migrating physical computing resources operates. The environment 100 includes an existing private computing network 106 that includes multiple physical computing machines 102 (or "physical machines"), each of which may be a server that provides application services to multiple client computers 101, or each of which may be another type of computing device that provides application services to a user (e.g., a workstation or personal computer). Each physical machine in this example is an existing computing system that does not provide virtualization. A physical machine is capable of running only a single operating system 107 at any given time, although it may have "dual-boot" or a similar capability that permits the machine to be booted up from one of many operating systems at the time of system startup. Each physical machine includes one or more applications 103 executing or loaded on the physical machine's operating system 107.

The operating system 107 on the physical machine 102 reads data from and writes data directly to a physical production data store 109, without the intervention of virtualization software and without using a virtual disk. The physical production data store 109 may include one or more of local disks, a network attached storage array, or any other type of production data storage media. The operating system 107 may be any type of operating system (e.g., Microsoft Windows, Linux operating systems, Sun Solaris operating systems, UNIX operating systems, or any other type of operating system). The applications 103 may be any applications (e.g., database applications, file server applications, mail server applications, web server applications, transaction processing applications, or any other type of application) that may run on the operating system 107. As just one illustrative example, the physical machine may be a mail server operated by an organization that is running a Windows Server operating system and Microsoft Exchange Server.

The existing private computing network 106 also includes a disaster recovery (DR) test module 111 and a migration module 113 described in greater detail herein. The various components shown in the existing private computing network 106 are connected to each other via a network 104A, which may be a local area network ("LAN"), a wide area network ("WAN"), a storage area network ("SAN"), a virtual private network ("VPN"), the public Internet, some other type of network, or some combination of the above. In some examples, each of the components shown in the existing private computing network 106 is operated by or on behalf of a single organization, such as a company, corporation, governmental entity, or other type of entity, to support the organization's operations.

The environment 100 also includes a virtual machine network 108, which includes multiple virtual machine hosts 105 operating or executing on physical computing systems, and a virtual machine manager 150. The various components shown in the virtual machine network 108 are connected to each other and the existing private computing network 106 via a network 104B, which may be a LAN, WAN, SAN, VPN, the public Internet, some other type of network, or some combination of the above. In some examples, the various constituent components of the virtual machine network 108 are operated by, or on behalf of, the same single organization associated with the existing private computing network. In other examples, the virtual machine network 108 is operated by an organization different from the organization that operates the existing private computing network 106. In such examples, the existing private computing network 106 and the virtual machine network 108 may be connected over the Internet or another public network.

A virtual machine host 105 (e.g., a VMware ESX Server, a Microsoft Virtual Server, a Microsoft Windows Server Hyper-V host, or any server running another type of virtualization software) hosts one or more virtual machines 110 (e.g., VMware virtual machines, Microsoft virtual machines, or any other type of virtual machine). Each virtual machine 110 has its own operating system 120 and one or more applications 115 executing or loaded on the virtual machine's operating system. The operating systems 120 may be any type of operating system 120 (e.g., Microsoft Windows, Linux operating systems, Sun Solaris operating systems, UNIX operating systems, or any other type of operating system) that can be hosted by the virtual machine host 105. The applications 115 may be any applications that run on the operating systems 120 (e.g., database applications, file server applications, mail server applications, web server applications, transaction processing applications, or any other type of application).

Each virtual machine host 105 has or is associated with a production data store 135 that stores the virtual disks 140 of the virtual machines 110 and otherwise stores production data and metadata of the virtual machines 110. The production data store 135 may span locally attached disks, networked storage arrays, and/or other types of production data storage media. The virtual disks 140 may be managed by a virtual machine file system or similar system. Virtual disk 140a is used by virtual machine 110a, and virtual disk 140b is used by virtual machine 110b. Although each virtual machine 110 is shown with only one virtual disk 140, each virtual machine 110 may have more than one virtual disk 140 in the production data store 135. A virtual disk 140 corresponds to one or more virtual machine disk files (e.g., one or more *.vmdk, *.vhd files, or any other type of virtual machine disk file) in the production data store 135.

A virtual machine 110, its applications 115, and its operating system 120 may also have the ability, via a raw device mapping ("RDM"), to directly read and write data and metadata on one or more logical unit numbers ("LUNs") or other logical subdivisions of an external data storage subsystem, such as a network storage array. In computer storage, a logical unit number or LUN is a number used to identify a logical unit, which is a device addressed by the SCSI protocol or similar protocols such as Fibre Channel or iSCSI. A LUN may be used with any device which supports read/write operations, such as a tape drive, but is most often used to refer to a logical disk as created on a SAN. Though not technically correct, the term "LUN" is often also used to refer to the drive or disk itself. Thus, as used further herein, "LUN" is intended to refer to not only the identifier associated with a logical disk or storage device, but also the associated logical disk or storage device itself. An RDM may be used to facilitate clustering between virtual machines or between physical and virtual machines. The RDM between a virtual machine and a LUN may be configured in either a virtual compatibility mode (a "virtual RDM" or "VRDM") or a physical compatibility mode (a "physical RDM" or "PRDM"). A virtual compatibility mode typically permits features similar to a virtual machine file system, such as file locking and snapshotting by the virtual machine host 105 or virtual machine manager 150. A physical compatibility mode typically permits the virtual machine to access the mapped LUN directly, to use conventional SAN commands, and to invoke most hardware functions of the external data storage subsystem. A physical RDM may permit applications on the virtual machine to avoid some overhead that would otherwise be imposed by performing input/output operations via a virtual machine host 105. Therefore an RDM may be used for critical or I/O-intensive applications. However, typically, a virtual machine host 105, such as an ESX server, or a virtual machine manager 150 cannot take a snapshot of a LUN that has been mapped to a virtual machine via a physical RDM, even though the virtual machine host and virtual machine manager may be aware of the existence of the physical RDM. This can make it difficult for conventional data backup systems to back up the data and metadata from a LUN mapped via a physical RDM.

VMware virtualization software supports RDMs. However, VMware virtualization software and other commercially available virtualization software (such as virtualization software from Citrix, RedHat, Oracle, Microsoft and others) may provide other types of mappings that to permit a virtual machine to directly read and write data and metadata on one or more LUNs or other logical subdivisions of an external data storage subsystem or device. The remainder of this application focuses on the management of virtual machines having RDM-mapped LUNs, however, it will be appreciated that the systems and methods described herein have equal applicability to a virtual machine that is mapped to or exposed to an external data storage subsystem or device via a different vendor-specific or standardized type of mapping.

The virtual machine manager 150 (e.g., a VMware VCenter server, a Microsoft System Center Virtual Machine Manager, a Citrix XenServer, an Oracle VM Manager, or a RedHat Enterprise Virtualization, or any server running another type of virtual machine manager software) manages or facilitates management of the virtual machines 110 and/or the virtual machine hosts 105. The virtual machine manager 150 and the virtual machine hosts 105 may each include an API component to expose or provide various types of APIs, such as an API for creating or configuring a new virtual machine 110; identifying, accessing and manipulating virtual disks 140; identifying, accessing and manipulating LUNs that are mapped to a virtual machine via an RDM; and performing other functions related to management of virtual machines 110.

Figure 1B:
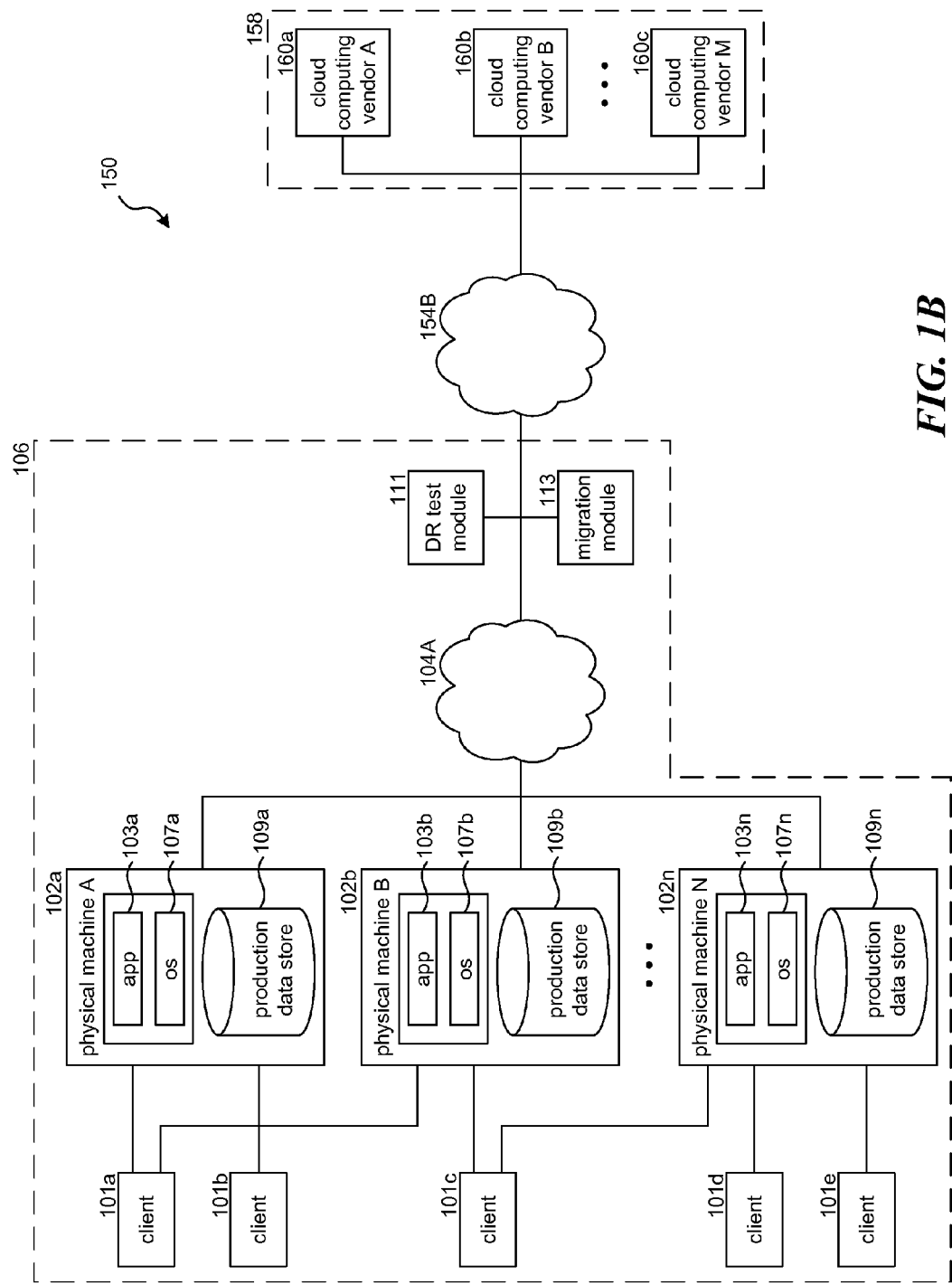
FIG. 1B is a block diagram illustrating another environment in which a system for migrating physical computing resources operates.

FIG. 1B is a block diagram illustrating another environment 150 in which a system for migrating physical computing resources operates. The environment 150 includes an existing private computing network 106, as described previously, that is coupled via a network 154B to a cloud service network 158. The cloud service network 158 includes one or more cloud services 160, each of which may be operated by a different cloud computing service vendor. Each cloud service 160 provides the ability to create and manage virtual machines, such as the virtual machines 110 described previously, and may also provide additional cloud services. Each cloud service 160 may provide APIs, such as an API for creating or configuring a new virtual machine 110; identifying, accessing and manipulating virtual disks 140; identifying, accessing and manipulating LUNs that are mapped to a virtual machine via an RDM; and performing other functions related to management of virtual machines hosted by the cloud service. Typically, the cloud computing service vendors that operate the various cloud services 160 are different from the organization that operates the existing private computing network 106. In such examples, the existing private computing network 106 is typically connected to the cloud service network 158 over the Internet or another public network.

The migration module 113, described in greater detail herein, manages the process of migrating or replicating some or all of the computing functionality provided by a physical machine 102 so that a virtual machine (such as a virtual machine 110 hosted in a virtual machine network 108 or a virtual machine hosted by a cloud service 160) can provide the same or similar computing functionality, such as providing application service to clients 101. For example, the migration module 113 can create a virtual machine that provides the same applications to clients 101 as physical machine A 102a and performs the related storage and manipulation of application-related data. In some examples, an organization may perform such a migration so that the physical machine may be decommissioned from service and replaced by the virtual machine. In some examples an organization may perform such a migration so that the virtual machine can be used for disaster recovery (DR) testing, i.e., testing to determine whether the organization would be able to quickly recover computing functionality and application-related data if a disaster, such as a fire, wrecked a physical machine 102. The DR test module 111 may perform functions related to using a virtual machine for DR testing.

In FIGS. 1A and 1B, the reference numbers ending with a lower case letter represent one particular instance of a more general class of components. For example, reference number 101a refers to one specific client. Thus, unless the context requires otherwise, a reference number in the text that omits any of the lower-case letters shown refers to one or many particular instances of the associated class of components. For example, "client 101" and "clients 101" refers to one and multiple of clients 101a, 101b, 101c, 101d, and 101e, respectively.

Illustrative System

Figure 2:
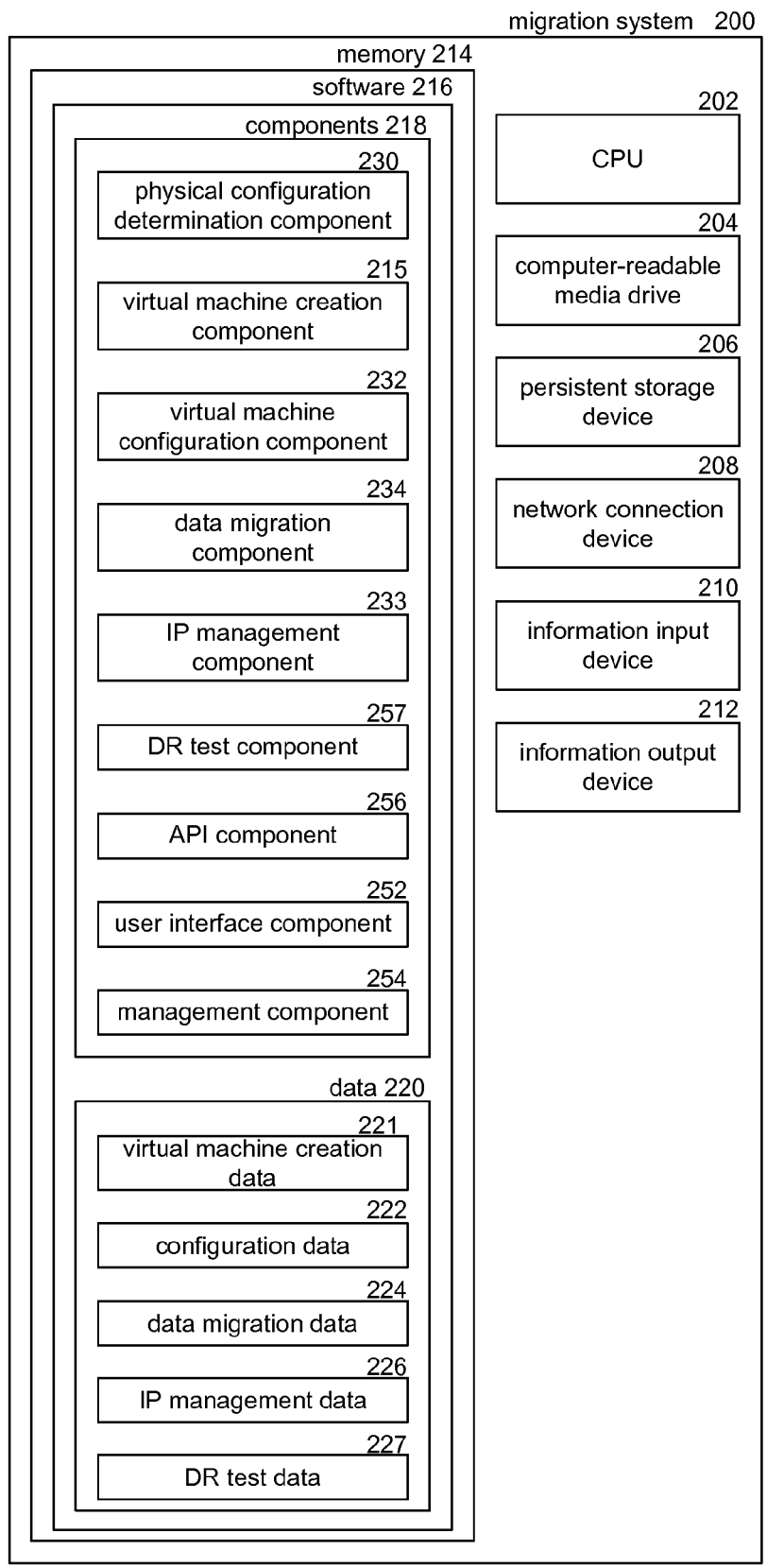
FIG. 2 is a block diagram illustrating details of a migration system that can migrate physical computing resources to virtual machines and cloud service providers and provide disaster recovery testing functionality.

FIG. 2 is a block diagram illustrating in more detail a migration system 200 that can perform the migration functionality, DR testing functionality, and other functionality described herein. The migration system 200 can be implemented by or in any of the components illustrated in FIGS. 1A and 1B, such as by or in the migration module 113 and/or DR test module 111.

The migration system 200 includes a memory 214. The memory 214 includes software 216 incorporating executable components 218 and data 220 typically used by the migration system 200. The data 220 comprises virtual machine creation data 221, configuration data 222, data migration data 224, IP management data 226, and DR test data 227. The virtual machine creation data 221 can include policies, rules, or criteria for creating new virtual machines. The configuration data 222 can include data regarding the current or past configuration, performance, and usage of physical machines or virtual machines. The configuration data can also include policies, rules, or criteria for determining the desired configuration or performance of a new virtual machine. The data migration data 224 can include policies, rules, or criteria for creating, storing, tracking, and using non-production copies of data from a physical machine, such as snapshot copies and backup copies, in order to migrate production data or metadata so that it is accessible and useable by a new virtual machine. The IP management data 226 can include policies, rules, or criteria for routing client requests for computing services to physical machines and virtual machines. The IP management data 226 may include information such as Domain Name System ("DNS") tables, routing tables, or other data structures that permit client requests for computing services to be resolved to the IP address, MAC address, or another type of address of an appropriate physical machine or virtual machine capable of providing the requested computing service. The DR test data 227 can include policies, rules or criteria for performing disaster recovery testing of a physical machine by using a virtual machine.

The components 218 may include subcomponents, modules, or other logical entities that assist with or enable the performance of some or all of the functionality of the migration system 200, such as a virtual machine creation component 215, a physical configuration determination component 230, a virtual machine configuration component 232, an IP management component 233, a data migration component 234, a user interface component 252, a management component 254, an API component 256, and a DR test component 257.

While described in more detail herein, a brief description of each component will now be provided. The physical configuration determination component 230 uses the configuration data 222 to determine the configuration, performance, and usage of an existing physical machine whose functionality is being migrated to a virtual machine. The virtual machine creation component 215 fulfills requests to create new virtual machines using the virtual machine creation data 221. The virtual machine creation component 215 may, for example, identify available virtual machine hosts 105, virtual machine managers 150, and/or cloud services 160 capable of hosting and managing virtual machines. The virtual machine creation component 215 may also apply information management policies to select a virtual machine host, virtual machine manager, and/or cloud service vendor to host and manage a newly created virtual machine. In conjunction with the virtual machine creation component 215 and physical configuration determination component 230, the virtual machine configuration component 232 uses the virtual machine creation data 221 and the configuration data 222 to determine the desired configuration of a newly created virtual machine.

The data migration component 234 migrates the production data and metadata used by a physical machine 102 to a new virtual machine by using the data migration data 224. For example, the data migration component may perform or request the performance of one or more information management operations that create a new, non-production copy (e.g., a snapshot, backup, auxiliary, or replication copy) of the physical machine's production data and metadata. Alternatively, the data migration component may use the data migration data 224 to identify an existing non-production copy of the physical machine's production data and metadata. The data migration component may then use a created or identified non-production copy of the data in order to provide the new virtual machine with access to the same application data, metadata, and/or other data as the physical machine.

The IP management component 233 redirects or resolves client requests for computing services to the address of particular physical machines and virtual machines. The IP management component may maintain and update DNS tables, routing tables, or similar data structures that map particular computing services or machine names to particular IP addresses, MAC addresses, or other types of addresses. As one example, the IP management component may update such data structures after the functionality of an existing physical machine has been migrated to a new virtual machine, so that clients 101 may use the newly created virtual machine instead of the existing physical machine transparently, without any interruption in service.

The DR test component 257 provides DR testing capabilities using created virtual machines. The API component 256 provides functions that enable programmatic interaction with the virtual machine manager 150, the virtual machines 110, the virtual machine hosts 105 and cloud services 160. For example, the API component may determine suitable API calls to make to interact with a particular type of virtual machine manager, virtual machine host, and/or cloud service. The user interface component 252 provides a user interface for managing the migration of physical machines 102 to virtual machines 110 and DR testing. The management component 254 provides ongoing virtual machine 110 management functionality, such as managing the protection of virtual machine production data and metadata via information management operations. As one example, as described in further detail herein, the management component may perform processes for creating non-production copies of the data and metadata from virtual machines, including virtual machines that utilize a physical RDM in order to store data and metadata in a LUN of an external, physical storage array. As another example, as described in further detail herein, the management component may perform processes for reverting or restoring virtual machines, including virtual machines that utilize a physical RDM in order to store data and metadata in a LUN of an external, physical storage array.

While items 218 and 220 are illustrated as being stored in the memory 214, those skilled in the art will appreciate that these items, or portions of them, may be transferred between the memory 214 and a persistent storage device 206 (e.g., a magnetic hard drive, a tape of a tape library, etc.) for purposes of memory management, data integrity, and/or other purposes.

The migration system 200 further includes one or more central processing units (CPU) 202 for executing the software 216, and a computer-readable media drive 204 for reading information or installing the software 216 from tangible, non-transitory computer-readable storage media, such as a floppy disk, a CD-ROM, a DVD, a USB flash drive, and/or other tangible and non-transitory computer-readable storage media. The migration system 200 also includes one or more of the following: a network connection device 208 for connecting to a network, an information input device 210 (e.g., a mouse, a keyboard, etc.), and an information output device 212 (e.g., a display).

Some or all of the software 216, components 218, and data 220 of the migration system 200 may be implemented as a plug-in to third-party virtualization software, such as the VMware ESX Server or VMware vCenter software and/or to information management software, such as Simpana software from CommVault Systems, Inc. The plug-in may be downloaded to the various physical machines 102, virtual machines 110, and/or virtual machine hosts 105, for example, from a server running VMware vCenter software, a storage manager (described further herein), and/or other system components such as the virtual machine manager 150. The functionality of the migration system 200 may be performed by any or all of such components. The components 218 are not limited to being implemented by or in a single computing device.

Migration of Physical Machines to Virtual Machines

Figure 3:
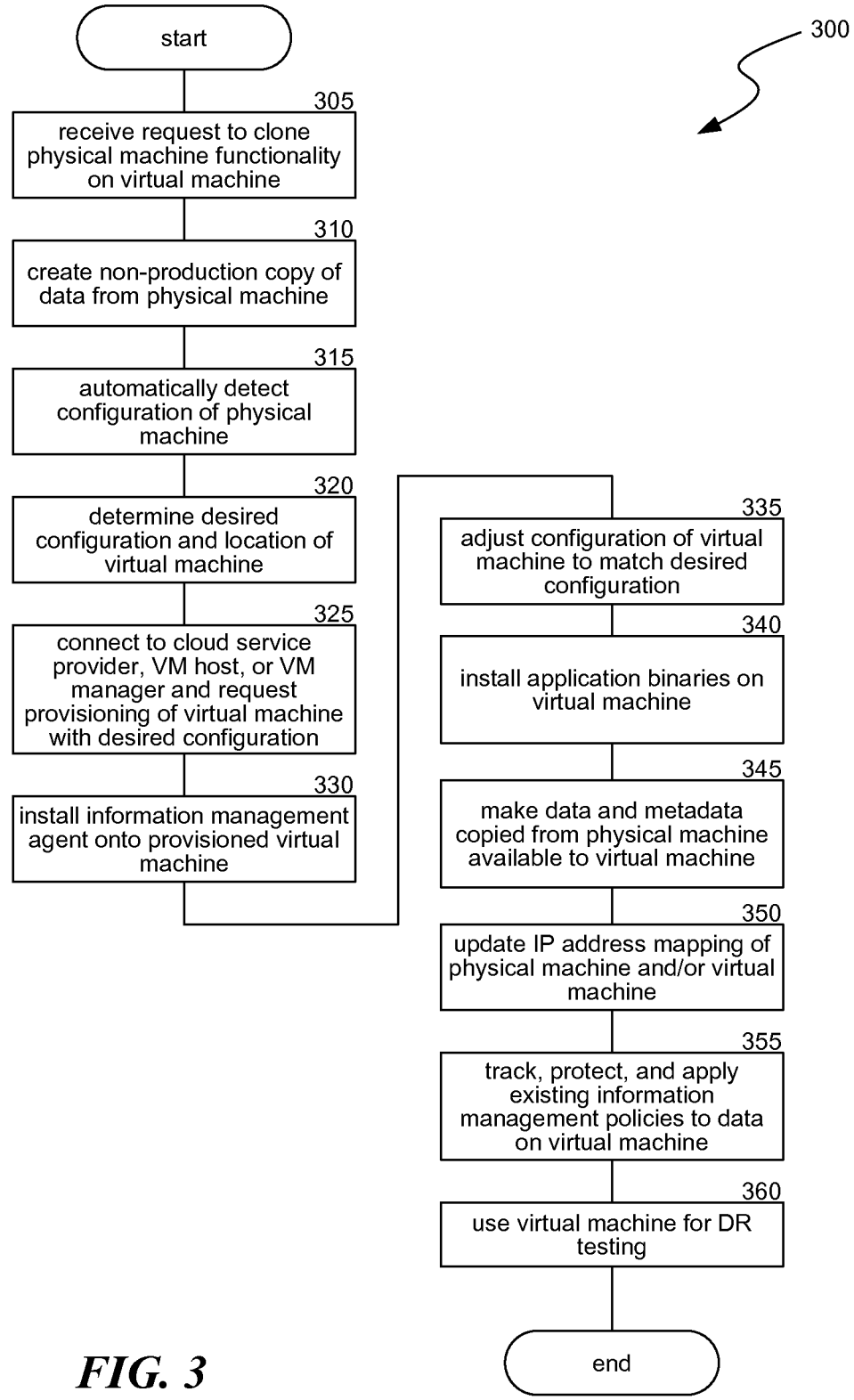
FIG. 3 is a flow diagram illustrating a process implemented by the migration system in connection with migrating physical computing resources to one or more virtual machines.

FIG. 3 is a flow diagram illustrating a process 300 implemented by the migration system 200 or another component in connection with migrating the functionality of a physical machine to a virtual machine. The process begins at block 305, when the migration system receives a request to clone some or all of the computing functionality of an existing physical machine to a new virtual machine, such as a virtual machine 110 hosted within a virtual machine network 108 or a virtual machine hosted by a cloud service 160. In one example, the request may indicate that it is being made so the new virtual machine can be used to replace the existing physical machine, for example, if the existing physical machine is being decommissioned. In another example, the request may indicate that it is being made so that the new virtual machine may be used for DR testing purposes. In yet another example, the request may indicate that only certain computing functionalities (e.g., only certain applications or production data) are to be migrated to the new virtual machine.

The migration process 300 may not be triggered by an explicit request, but may be automatically triggered. For example, the migration system or another system component monitoring the physical machine may determine that a set of criteria associated with an information management policy has been met and therefore, the physical machine should be migrated or an administrator should be notified that a migration is recommended. For example, a migration system may receive notifications that the physical machine has experienced an increased number hard disk errors, has experienced reduced performance, is older than a threshold age or time (e.g., over three years old,) has lost some of its data redundancy protection or a disk drive (e.g., if a RAID volume has failed), has lost network connectivity, has been infected by a virus, or otherwise presented symptoms indicative of system, application, or data instability. As another example, a migration system may determine that it is time to initiate and perform a scheduled (e.g., periodic) DR test of the physical machine.

At block 310, the migration system 200 creates at least one non-production copy of the production data store 109 from the physical machine 102 (or a portion thereof), which is typically a point-in-time copy of the production data and metadata of the physical machine. For example, the migration system may request that another system component (e.g., a snapshot device or utility) create a snapshot copy of the data and metadata stored in the production data store 109 that is associated with the physical machine. Taking such a snapshot copy typically does not substantially impact the performance of the physical machine because most of the underlying production data is not physically copied. Rather, a set of pointers is created that references the underlying production data and metadata as it existed at a particular point in time. As another example, the migration system 200 may request that another system component create a backup or auxiliary copy of the data and metadata in a non-production data storage medium, such as a backup server, which may be performed in whole or in part using one-touch backup and recovery techniques such as those described in commonly-assigned U.S. patent application Ser. No. 13/076,792, filed Mar. 31, 2011, entitled "RESTORING COMPUTING ENVIRONMENTS, SUCH AS AUTORECOVERY OF FILE SYSTEMS AT CERTAIN POINTS IN TIME" and assignee's U.S. patent application Ser. No. 10/989,893, filed Nov. 15, 2004, entitled "SYSTEM AND METHOD FOR PERFORMING INTEGRATED STORAGE OPERATIONS," now U.S. Pat. No. 7,734,578, both of which are hereby incorporated by reference herein in their entirety.

In some examples, the migration system uses an existing backup copy of the data and metadata in order to create another "auxiliary" backup copy that will be used by the new virtual machine. For example, the auxiliary copy may be created in a storage device accessible to the virtual machine host 105 or cloud service 160 that will be hosting the virtual machine. The auxiliary copy may be periodically or continuously updated to reflect ongoing changes to the existing backup copy. To illustrate, an auxiliary copy may be periodically or continuously updated to facilitate periodic DR testing of the same physical machine, e.g., with the same auxiliary copy updated every time a new DR test is initiated. The migration system may create a backup or auxiliary copy using source-side deduplication techniques that only send a copy of the blocks that have changed since the last point-in-time copy was made (e.g., the last time the physical machine was DR tested), e.g., as described in commonly-assigned U.S. patent application Ser. No. 12/982,087, filed Dec. 30, 2010, entitled Systems and Methods for Retaining and Using Data Block Signatures in Data Protection Operations, which is hereby incorporated by reference herein in is entirety. As yet another example, the migration system may use a hardware-based replication device or utility to continuously or intermittently replicate a copy of the physical machine's production data and metadata to another destination storage device accessible to the virtual machine host 105 or cloud service 160 that will be hosting the virtual machine.

Alternatively or additionally, the migration system 200 may identify one or more previously created non-production copies of the data and metadata from the physical machine. For example the migration system may identify an existing snapshot, backup, auxiliary, replica, archive, or other type of non-production copy of the data from the physical machine that was previously created at a particular point in time, e.g., by an information management system, as described in greater detail herein. In some examples, at block 310, the migration system 200 may create or identify a non-production copy that is also used by an information management system for a different purpose other than just migration and/or DR testing. For example, the migration system 200 may identify an existing backup copy of the physical machine's data and metadata that is stored by a cloud service for backup and recovery purposes, and use that non-production copy, as described further herein, for DR testing purposes.

The non-production copy at block 310 may be created in accordance with an applicable information management policy. For example, a policy may specify that only data and metadata that is classified as non-confidential or high-priority may be copied in order to be moved to a new virtual machine. As such, the non-production copy may be limited to a subset of the data and metadata of the physical machine, e.g., for improved security or reduced costs.

In some examples, at block 310, more than one type of non-production copy may be created. For example, a backup or auxiliary copy may be created of the physical machine's local file system and a snapshot may be taken of a volume that contains an application-specific data source (e.g., a snapshot may be taken of an Oracle or Exchange database), or vice versa. Also, at block 310, more than one information management agent 980 may be used to create the non-production copy or copies (e.g., one may be used to create copies of a files system and another may be used to create copies of application-specific data source (e.g., an Oracle or Exchange database).

After a non-production copy is created or identified, the process 300 proceeds at block 315, where the migration system automatically detects the configuration of the physical machine, which may be performed in whole or in part using one-touch backup techniques and kernel-based techniques such as those described in commonly-assigned U.S. patent application Ser. Nos. 13/076,792, 10/989,893, both of which are incorporated by reference above, and in commonly-assigned U.S. patent application Ser. No. 12/895,377, filed Sep. 30, 2010, entitled "Kernel Swapping Systems and Methods for Recovering a Network Device, now U.S. Patent Application Publication No. 2012/0017111, which is also hereby incorporated by reference herein in its entirety. The configuration may be determined in conjunction with the creation of a non-production copy, e.g., during a backup operation.

For example, the migration system may determine the type and version of the operating system and the type and version of the applications installed on the physical machine. The migration system may also determine the operating system-specific and application-specific settings and configurations, such as the host name of the file system, network configurations, drivers used, peripheral configurations, how and where drives are mounted (i.e., mount points), disk layout information, disk partitions, volume manager configurations, volume groups, volume names, the IP or network address of the file system, file system types (e.g., NTFS, FAT32, ext), port assignments, where applications are installed, and registry values. The migration system may determine the configuration of the physical machine as it existed at the time the non-production copy of the physical machine data was made. To do so, the migration system may mine the operating system registry, boot sectors, partition layouts, boot.ini file, kernel, and/or other files used by the operating system and/or applications on the physical machine In some examples, the data storage server 110 may capture some or all configuration parameters from a system configuration xml file, such as:

```
<system_configuration>
    <site name="client1" >
        <hosts>
            <host_ref name="host1"/>
        </hosts>
    </site>
    <group name="mysql" gid="500"/>
    <user name="mysql" uid="500">
        <groups>
            <group_ref name="mysql"/>
        </groups>
    </user>
    <host name="host1" >
        <users>
            <user_ref name="mysql">
        </users>
        <profiles>
            <profile_ref name="workstation"/>
        </profiles>
    </host>
    <profile name="workstation" >
        <components>
            <component_ref name="user-setup" >
            <component_ref name="mysql-db" >
        </components>
    </profile>
    <component name="user-setup">
    </component>
    <component name="mysql-db">
    </component>
</system_configuration>
```

As another example, at block 315, the migration system 200 may determine the physical hardware resources available to the physical machine, such as the specifications of the machine's processors (e.g., number of processors, clock rate, manufacturer, model), memory (e.g., type, speed, and capacity), hard disks or other production data stores such as networked storage arrays (e.g., type, speed, capacity, and fault tolerance), communication configurations (wired and/or wireless), network adapters (e.g., number and type of network cards), and other hardware. The migration system may also determine how the physical machine presently uses or previously used the physical resources available to it. To illustrate, the migration system may determine historical trends in the quantity or quality of data processing, memory, stored production data, data throughput, and/or networking bandwidth used by the physical machine.

The operating system, application, physical resource, and other configuration information may be obtained from the point-in-time non-production copy obtained at block 310, for example, in a snapshot, backup, auxiliary, replication, or other non-production copy of the registry, boot sectors, partition layouts, etc. The migration system may also mine sysfs and procfs file systems. Alternatively or additionally, the migration system may determine such information directly from the physical machine itself. Alternatively or additionally, the migration system may also obtain configuration information that has been stored elsewhere, for example, in management data maintained by an information management system, described below. The migration system may also obtain and utilize configuration information using kernel-based techniques that capture and utilize a kernel image for recovery purposes, as described in commonly-assigned U.S. patent application Ser. No. 12/895,377, introduced and incorporated by reference above, e.g., for Linux-based systems.

At block 320, the migration system 200 determines the desired configuration and location of the new virtual machine that should be used to provide the requested functionality. The desired configuration may describe, inter alia, the type of operating system, the operating system-specific settings (e.g., disk partitions, network configuration (e.g., IP address), peripheral configuration, registry values), the type of applications, the application-specific settings/configurations, and the quality and quantity of virtual resources (e.g., virtual disks, virtual memory, virtual processing, virtual networking) to deploy at the virtual machine. To make the determination, the migration system may analyze the detected configuration and/or usage of the physical machine described at block 315. By default, the migration system may determine that the new virtual machine should have the same configuration as the physical machine, including the same operating system, applications, data processing capability, memory, disk or other production data storage capacity, data input-output throughput, and/or networking hardware capabilities.

However, as part of the analysis, the migration system 200 may make alterations to the default configuration. As a first example, the migration system 200 may determine that the IP address or hostname of the new virtual machine should be different from that of the physical machine, so that the two machines may be run simultaneously without conflict. As another example, as part of the analysis, the migration system may determine whether there are trends in the usage of the physical machine that suggest that the new virtual machine should have a configuration different than the existing physical machine. To illustrate, the migration system may identify that the physical machine has experienced a trend of increasing use of its hard disks or other production data stores, and extrapolate that trend in order to determine that the virtual machine should be created with a higher data storage capacity than the physical machine in order to accommodate a predicted higher future use. To illustrate further, the migration system may identify that the physical machine has experienced a trend of decreasing use of its hard disks or other production data stores, and extrapolate that trend in order to determine that the virtual machine should be created with a lower data storage capacity than the physical machine in order to accommodate a predicted lower future use. Similarly, the migration system may identify and use trends in the physical machine's usage in order to adjust the desired processing, memory, networking, or other characteristics of the new virtual machine away from the default configuration.

As a second example, the migration system 200 may use information in the initial request received at block 305 to determine whether to adjust the desired characteristics of the new virtual machine away from the default configuration. To illustrate, the migration system may determine that the new virtual machine is being temporarily deployed only for DR testing and that the virtual machine will not replace the existing physical machine. In such an example, the migration system may determine that the production data storage capacity of the virtual machine should be set at approximately the current storage capacity usage of the existing physical machine because the new virtual machine will not generate a substantial quantity of new production data during the DR testing. As another example, the migration system may determine that only a subset of the applications installed on the physical machine are to be migrated, and therefore determine that only a subset of the physical machine's production data and metadata will be migrated, again reducing the capacity of production data storage needed by the virtual machine.

As a third example, the migration system may determine whether the drivers that were used on the existing physical machine will be compatible with the virtual machine or whether different drivers should be used. If the migration system determines that a particular driver is not compatible, the migration system may change the driver used at the virtual machine. For example, if a physical machine accessed a particular device via an SCSI connection using a SCSI-compatible driver, but the virtual machine will access a comparable device via an iSCSI connection, the migration system may determine that it should select a different iSCSI-compatible driver for the virtual machine to manage the comparable device.

In order to determine the desired configuration and location of the new virtual machine, the migration system 200 may access and implement policies, such as information management policies described further herein. For example, the migration system may access a policy that dictates preferred virtual machine hosts 105, virtual machine managers 150, and/or cloud services 160 to use when migrating particular physical machines. Alternatively, in order to determine the desired configuration and location of the new virtual machine, the migration system may use policies or preferences received from a user as part of the request received at block 305.

At block 325, the migration system 200 connects to a cloud service provider, virtual machine host, or a virtual machine manager and requests that they provision a new virtual machine with the desired configuration. To do so, the migration system may invoke commands specified by an API that are specific to the particular cloud service provider, virtual machine host, or virtual machine manager. In response, the cloud service provider, a virtual machine host, and/or virtual machine manager should provision a new virtual machine having the desired virtual resources and operating system, and that may also have some or all of the desired operating system configurations (e.g., disk partitions) and/or desired applications installed. For example, if the physical machine had the operating system installed on a D:/drive and Exchange installed on an E:/drive, the new virtual machine may be similarly configured. If the physical machine had access to an external storage array, a cloud service provider may also provision a similar external storage array and make this array available to the new virtual machine for storage (e.g., via a virtual or physical RDM). The request made at block 325 may comprise using one or more virtual machine templates. In some implementations, the virtual machine is provisioned from an existing virtual machine. For example, as discussed in U.S. patent application Ser. No. 13/765,389 filed Feb. 12, 2013, which is incorporated herein by reference in its entirety, the virtual machine may be created from a repurposed virtual machine.

At block 330, the migration system 200 may install an information management agent, described further herein, onto the provisioned virtual machine. The information management agent may be configured to, inter alia, perform information management operations on the production data of the provisioned virtual machine, and restore or otherwise provide production data to the virtual machine from a non-production copy of the data. In some examples, to simplify the process 300, the information management agent may not be installed, for example if a data restoration operation is not performed at the virtual machine.

At block 335, the migration system 200 adjusts the configuration of the virtual machine to match the desired configuration that was determined at block 320, which may be performed in whole or in part using one-touch recovery techniques such as those described in commonly-assigned U.S. patent application Ser. Nos. 13/076,792 and 10/989,893, both of which are incorporated by reference above. For example, using the desired configuration determined at block 320, the migration system may replicate operating system-specific or application-specific configurations or settings. To illustrate, the migration system may adjust registry values, disk partition information, networking configurations, and/or other settings or configurations of the new virtual machine to bring them in line with the desired configuration.

At block 340, the migration system 200 may install application binaries on the virtual machine and as necessary, reconfigure the applications. The application binaries installed on the virtual machine may be entirely new application binaries or the binaries installed may be derived from a non-production copy of the physical machine's production data that was created or identified at block 310 using restoration methods similar to those described at block 345 below. If the application binaries are derived from a backup or other non-production copy, an information management agent may be used to derive the binaries from the non-production copy. The system may send a message to an information management system to indicate a copy of an application was made so that the information management system can track compliance with software licenses.

At block 345, the migration system 200 makes application data, metadata, and/or other production data copied from the production data store 109 of the physical machine 102 available to the virtual machine. The data and metadata that is made available may be limited in accordance with applicable information management policies. For example, data that has been classified as "confidential" under an information management policy may not be made available to the virtual machine.

In some examples where a snapshot was created or identified at block 310, in order to make the snapshot, data, and metadata available to the virtual machine, the migration system may expose or otherwise provide the virtual machine with access (e.g., network access) to the physical production data store 109 associated with the physical machine, or a replica of the physical production data store. The replica may be a continuously-updated replica of the production data store 109 created using a hardware-based replication technology. The production data store 109 or replica thereof will typically contain both the set of snapshot pointers or references as well as the underlying physical data blocks. Using API calls, the migration system may instruct the operating system 120 on the virtual machine, the virtual machine host 105, or the virtual machine manager 150 to mount the snapshot stored therein as a disk on the virtual machine. In such examples, the time, bandwidth, and additional storage capacity needed to bring up the virtual machine may be greatly reduced, because there is no need to physically copy data blocks over from the source physical machine and store those blocks at the destination virtual machine.

Where a backup, auxiliary, or other type of non-production copy was created or identified at block 310, in order to make the data and metadata available to the virtual machine, the migration system may instruct an information management agent to restore the data and metadata from the backup, auxiliary, or other non-production copy to a virtual disk 140 or other production data store 135 of the virtual machine. This may require the agent to "unpack" the data from a proprietary format (such as a proprietary backup format) into a native application format that is readable using conventional file system calls. Alternatively, if the non-production copy has retained useable file system information (but other data is in a non-native format), the migration system may simply use API calls to instruct the operating system 120 on the virtual machine, the virtual machine host 105, or the virtual machine manager 150 to mount such a copy as a disk on the virtual machine (e.g., by mounting a replication or auxiliary copy from a storage area network or a local disk), possibly via an RDM.

In some examples, at block 345, two different information management agents may restore the data and metadata from backup, auxiliary, or other non-production copy to a virtual disk 140 or other production data store 135 of the virtual machine. For example, a first information management agent may be responsible for restoring application binaries and file system files to a virtual disk 140 or other production data store 135 of the virtual machine. A second, application-specific information management agent (e.g., specific to Exchange or Oracle data) may restore application-specific data (e.g., an Exchange or Oracle database) to a virtual disk 140 or other production data store 135 of the virtual machine and take other steps, e.g., to bring a database into a consistent state.

If, at block 310, more than one type of non-production copies were created or identified (e.g., a backup copy and a snapshot copy), then the copied data and metadata may be made available to the virtual machine through more than one of the mechanisms described above. For example, a restoration may be performed from a backup or auxiliary copy to make the files on the physical machine's local file system available to the virtual machine and a snapshot of a volume that contains application-specific data source (e.g., a snapshot may be taken of an Oracle or Exchange database) may be mounted to the virtual machine.

At block 345, the migration system 200 may also play back or analyze operating system-specific or application-specific logs or journals, e.g. logs obtained from the existing physical machine 102, or invoke application-specific update mechanisms in order to bring the operating system, applications, data and metadata on the virtual machine into a state that is consistent with the existing physical machine. For example, the migration system may play back or analyze file system change journals, database logs or e-mail server logs or invoke application-specific update mechanisms by binding an application to the existing physical machine. As another example, if at block 310 a non-production copy of data and metadata from a physical machine was created at a first time, T1 and at block 345, the data and metadata was made available to the destination machine at a later time T2, the migration system may capture the logs from the physical machine for the window between times T1 and T2 and play back those captured logs. These logs may be provided by applications such as Oracle or Exchange. For example, with a snapshot, the system may need to access a log of changes made from when the snapshot was taken to another point in time reflected in the log, e.g., as described in assignee's U.S. patent application Ser. No. 12/558,947, filed Sep. 14, 2009, entitled "USING A SNAPSHOT AS A DATA SOURCE," now U.S. Patent Publication No. 2010/0070726; assignee's U.S. patent application Ser. No. 12/978,984, filed Dec. 27, 2010, entitled "SYSTEMS AND METHODS FOR ANALYZING SNAPSHOTS," now U.S. Patent Publication No. 2011/0161295; and assignee's U.S. patent application Ser. No. 12/979,101, filed Dec. 27, 2010, entitled "SYSTEMS AND METHODS FOR PERFORMING DATA MANAGEMENT OPERATIONS USING SNAPSHOTS," now U.S. Patent Publication No. 2011/0161299. All of these applications are hereby incorporated by reference herein in their entirety. At block 345, the migration system may also query the file system of the existing physical machine for any changes made to files or metadata on the physical machine that occurred between the time that the non-production copy was created at block 310 and the time of the migration (e.g., using last modification times). The migration system may then adjust the virtual machine's data or metadata to reflect these changes.

At block 350, the migration system 200 may update a mapping of the IP address of the physical machine and/or virtual machine, so that clients 101 will be directed or routed to the virtual machine instead of the physical machine. For example, if live DR testing is being performed with the virtual machine, or the existing physical machine is being decommissioned entirely, a DNS table, routing table or similar data structures may be updated so that the table points to the IP address (or another type of address, such as a MAC address) of the virtual machine instead of pointing to the address of the existing physical machine.

At block 355, the migration system tracks, protects, and/or applies existing information management policies to the production data and metadata of the virtual machine on an ongoing basis. Information management policies are described in greater detail herein. For example, the migration system may apply the same or similar information management policies to the virtual machine that were applied to the physical machine. To illustrate, the migration system may regularly back up or otherwise create non-production copies of the production data store 135 of the virtual machine on a prescribed schedule, e.g., as described in commonly-assigned U.S. patent application Ser. No. 12/553,294, filed Sep. 3, 2009, entitled "SYSTEMS AND METHODS FOR MANAGEMENT OF VIRTUALIZATION DATA," now U.S. Patent Publication No. 2010/0070725, is hereby incorporated by reference herein in its entirety. As another example, the migration system may take steps to shut down and/or archive the virtual machine if it becomes inactive, as described in commonly-assigned co-pending U.S. patent application Ser. No. 13/250,962, filed Sep. 30, 2011, entitled "EFFICIENT DATA MANAGEMENT IMPROVEMENTS, SUCH AS DOCKING LIMITED-FEATURE DATA MANAGEMENT MODULES TO A FULL-FEATURED DATA MANAGEMENT SYSTEM", is hereby incorporated by reference herein in its entirety.

Next, at block 360, the migration system 200 may use the virtual machine for DR testing. For example, the migration system may determine whether the virtual machine is actually able to bring up an application (e.g., a mail server or database application) and retrieve certain emails or records, so that the application provides the same or comparable level of service as it did at the source physical machine. As another example, the migration system may determine whether the virtual machine is able to access all of the same application data, metadata, and/or other production data that was available to the source physical machine, and whether any data or metadata was lost in the migration process. The process 300 then ends. During the process 300 and in other processes and methods described herein, the migration system may employ backup methods, restoration methods, recovery methods and other systems and methods described in commonly-assigned U.S. Provisional Patent Application 61/618,579, entitled DATA STORAGE RECOVERY AUTOMATION, filed Mar. 30, 2012, which is hereby incorporated by reference herein in its entirety.

In some examples, the process 300 permits periodic or scheduled DR testing. For example, a request may be received for DR testing to be performed on a requested periodic basis or other schedule. In accordance with the schedule, the process 300 may be performed repeatedly. During each iteration of process 300 a virtual machine may be created that has the appropriate configuration and data access to permit the scheduled DR test. During the process 300, a prescribed DR test may be performed (e.g., using scripts) and the results reported, e.g., to the user who requested the DR testing.

As described in greater detail above, the process 300 permits several different approaches to DR testing. As a first example, the process 300 may permit an organization to perform a DR test of a physical server at a particular point in time, including historical time points, by mounting a snapshot stored on a production data store 109 on a new virtual machine. By exposing the production data store 109 to the virtual machine for this purpose, the process may avoid the time and bandwidth needed to transmit all or most of the contents of the production data store 109 over a network to the virtual machine being used for DR testing purposes. Instead, the virtual machine can use the snapshot to retrieve only the subset of data and metadata from the production data store 109 that is needed to perform the DR test.

As a second example, the process 300 may permit an organization to perform a DR test of a physical server at a particular point in time, including historical time points, by mounting a snapshot stored on a continuously updated replica of a production data store 109 on a new virtual machine. By maintaining a continuously updated replica of the production data store 109 for this purpose and using snapshots, the process may be able to initiate a DR test almost instantly, without needing to first transmit all or most of the contents of the production data store 109 over a network to the virtual machine being used for DR testing purposes. In both of these two examples, the process can avoid having to create a virtual disk file (such as a .vmdk file) containing the data and metadata from the production data store 109 by using a snapshot instead.

As a third example, the process 300 may permit an organization to perform a DR test of a physical server at a particular point in time by mounting or restoring from a backup or auxiliary copy. The backup or auxiliary copy may be updated periodically or continuously for the purpose of periodic DR testing. In order to reduce the network bandwidth and data storage requirements of the DR testing, the backup or auxiliary copy may be created by using client-side or other deduplication techniques that don't require a block-by-block copy of all of the data and metadata from the physical machine.

Other Types of Migration

Although FIG. 3 describes a process 300 for migrating the functionality of a physical machine to a virtual machine, adaptations may be made to the process to instead migrate a source physical machine to another destination physical machine, migrate a source virtual machine to another destination virtual machine, or migrate a virtual machine to a physical machine.

As a first example, to migrate the functionality of a source physical machine to another destination physical machine, the migration system may perform a process very similar to FIG. 3 in response to receiving a request to clone a source physical machine's functionality to a destination physical machine. Alternatively, the migration system may do so automatically, e.g., upon detecting increased errors or a drive failure in the source physical system. However, in lieu of performing blocks 325-340 as shown in FIG. 3, the migration system may additionally or alternatively perform a one-touch backup and recovery operation to ensure that the destination physical machine has an operating system and applications installed and configured in accordance with a desired configuration by directly copying or porting the operating system and some or all application binaries, or application-specific data and configuration information from the source physical machine directly to the destination physical machine. Such one-step migration is described further in assignee's U.S. patent application Ser. Nos. 13/076,792 and 10/989,893, both of which are incorporated by reference above. As necessary, the migration system may adjust the configuration of the new physical machine and install some application binaries (either new or from a non-production copy) to ensure all of the desired applications are installed on the destination machine, e.g., as described previously with respect to blocks 335-340. Then, as discussed previously at block 345, the application data, metadata, and other files in the file system may be recovered from a backup or other non-production, point-in-time copy of the source physical machine's data and metadata.

Also, the migration system 200 may play back or analyze operating system-specific or application-specific logs or journals from the source physical machine, or invoke application-specific update mechanisms, e.g., by binding an application to the source physical machine. For example, if a non-production copy of data and metadata from a source physical machine was created at a first time, T1 and the data and metadata was made available to the destination machine at a later time T2, the migration system may capture the logs from the source machine for the window between times T1 and T2 that and play back those captured logs. These logs may be provided by applications such as Oracle or Exchange. The migration system may also query the file system of the source physical machine for any changes made to files or metadata on the source physical machine that occurred between the time that the non-production copy was created and the time of the migration and adjust the destination machine's data or metadata to reflect these changes. Therefore, the operating system and applications on the destination physical machine may be migrated from a first location (i.e., the source physical machine) while most or all of the application data, metadata, and other files are migrated from a second, different location (i.e., a backup server that has a backup copy of the source machine's data and metadata).

As a second example, to migrate the functionality of a source virtual machine to another destination virtual machine, the migration system may perform a process very similar to FIG. 3 automatically or in response to receiving a request to clone a source virtual machine's functionality to a destination virtual machine. At block 310, a non-production copy of a source virtual machine, such as a snapshot copy, may be taken, e.g. via API calls to the source machine's host 105, a virtual machine manager 150, or by processes such as those described herein with respect to FIGS. 4 and 5 or in assignee's U.S. patent application Ser. No. 12/553,294, filed Sep. 3, 2009, entitled "SYSTEMS AND METHODS FOR MANAGEMENT OF VIRTUALIZATION DATA," now U.S. Patent Publication No. 2010/0070725, which is incorporated by reference above. Alternatively or additionally, at block 315, the migration system may automatically detect the configuration of the source virtual machine via API calls to the source machine's host 105 or the virtual machine manager 150.

As a third example, to migrate the functionality of a source virtual machine to a destination physical machine, the migration system may perform a process very similar to FIG. 3 automatically or in response to receiving a request to clone a source virtual machine's functionality to a destination physical machine. For example, a user may identify, via a GUI of the migration system, the source virtual machine he intends to clone to a physical machine, and a new client name and hostname. After migration, the new physical machine may be updated to the provided new client name and may be registered as a client of an information management system. Then, the migrated virtual machine's hostname and IP configuration may be updated.

The migration methods described herein may be used for many purposes other than decommissioning an existing machine or disaster recovery. For example, the processes may be employed to create a clone machine for the purposes of complying with a legal hold or e-discovery request that requires that data or metadata be preserved as it existed at a particular point in time. As another example, a virtual machine may be migrated from one cloud service 160 to another cloud service 160, a virtual machine 110, or a physical machine 102 to reduce costs or improve performance.

At the conclusion of process 300 or a variant thereof, other steps may be performed. For example, if a source physical machine is decommissioned after its functionality has been migrated, the migration system may take other steps to dispose of the source physical machine. For example, the migration system may implement a routine to permanently wipe the data and metadata from the source physical machine and notify a server (such as an intranet site or auction site) that the source physical machine is available, e.g., for use by other users in the organization or for sale to external parties, along with a description of the physical machine's specifications, as determined at block 315. Thus, the migration system may automatically post an accurate description of the machine's specification, which was already identified above, to an auction site in order to sell the physical machine.

Information Management Operations on Virtual Machines with a Physical RDM

As described further herein, an information management system may create and use non-production copies of a virtual machine's data and metadata, such as snapshot, backup, or archive copies of the virtual machine's data and metadata. A virtual machine host 105 on which a virtual machine resides is typically unable to create or cause the creation of a snapshot of a LUN that is mapped to the resident virtual machine via a physical RDM (a "PRDM-mapped LUN"). Thus, as described below, the management component 254 may perform processes to create and use non-production copies of the data and metadata stored on PRDM-mapped LUNs.

Figure 4:
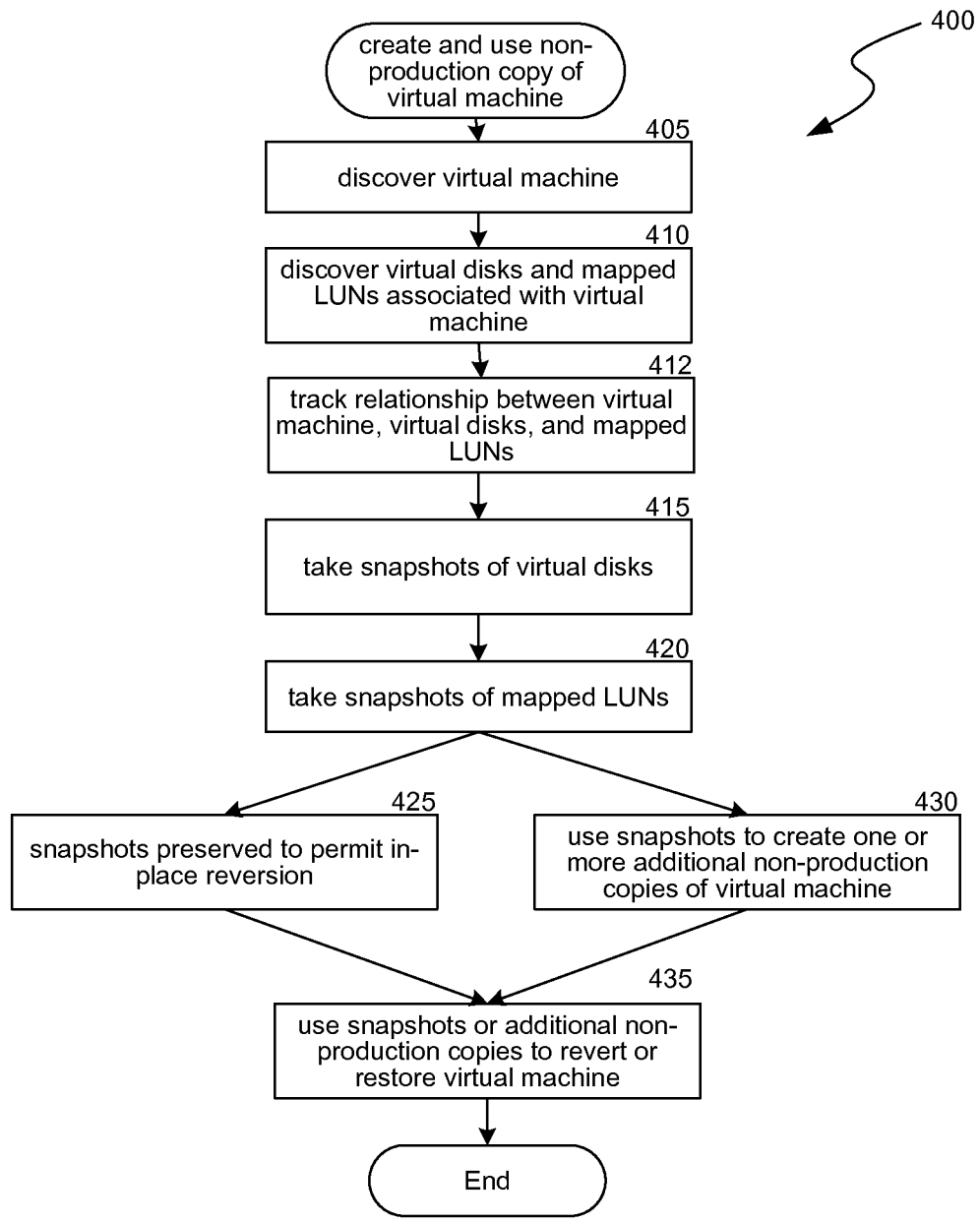
FIG. 4 is a flow diagram illustrating a process for creating and using a non-production copy of the data and metadata of a virtual machine having a mapped LUN.

FIG. 4 illustrates a process 400 for creating and using a non-production copy of the data and metadata of a virtual machine that has a mapped LUN (e.g., a PRDM-mapped LUN). Although FIGS. 4, 5, 6A, 6B, and 7 are described herein for the specific example case of virtual machines having PRDM-mapped LUNs, it will be appreciated that the processes described in these figures have broader applicability to virtual machines that have other mapped LUNs that are mapped using other types of mappings, as introduced above. The process begins at block 405, where the management component 254 discovers a virtual machine having a PRDM-mapped LUN. Methods for the discovery, detection, and/or identification of virtual machines 110 are described in commonly-assigned co-pending U.S. patent application Ser. No. 13/250,962, filed Sep. 30, 2011, entitled "EFFICIENT DATA MANAGEMENT IMPROVEMENTS, SUCH AS DOCKING LIMITED-FEATURE DATA MANAGEMENT MODULES TO A FULL-FEATURED DATA MANAGEMENT SYSTEM" and commonly-assigned U.S. patent application Ser. No. 12/553,294, filed Sep. 3, 2009, entitled "SYSTEMS AND METHODS FOR MANAGEMENT OF VIRTUALIZATION DATA," now U.S. Patent Publication No. 2010/0070725, both of which are incorporated by reference herein in their entirety. These methods include querying a virtual machine host 105 or a virtual machine manager 150 via an API, crawling or spidering a network, and accessing a data structure that tracks the existence and network location of virtual machines. At block 410, the management component 254 discovers and identifies the virtual disks and the PRDM-mapped LUNs associated with the virtual machine, for example by using APIs to query the virtual machine host 105 on which the virtual machine resides or a virtual machine manager 150.

Figure 7:
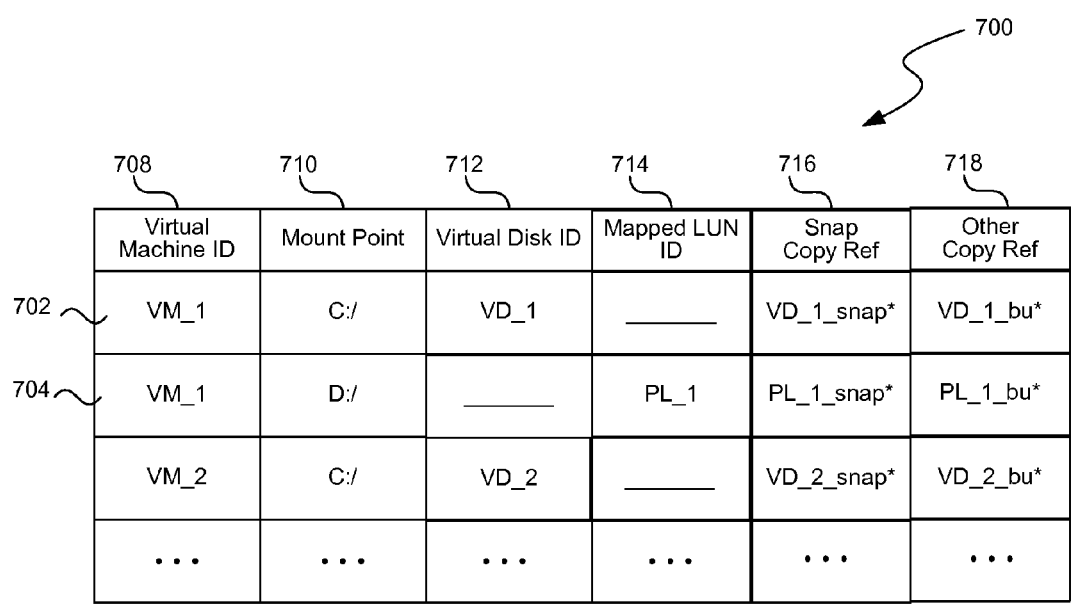
FIG. 7 illustrates an example of a virtual machine tracking data structure.

At block 412, the management component 254 tracks the relationship between the virtual machine and its virtual disks and PRDM-mapped LUNs. For example, the management component may maintain, e.g., in data 220, a virtual machine tracking data structure, such as that shown in FIG. 7. As shown in FIG. 7, the virtual machine tracking data structure 700 may have a virtual machine ID column 708 that contains an identifier or reference for each discovered virtual machine, a virtual disk ID column 712 that contains an identifier or reference for each discovered virtual disk associated with a virtual machine, and a mapped (e.g., PRDM-mapped) LUN ID column 714 that contains an identifier or reference for each discovered PRDM-mapped LUN associated with a virtual machine. The virtual machine tracking data structure may also include a mount point column 710 that indicates the drive location or drive identifier (e.g. CI) where each virtual disk or PRDM-mapped LUN is mounted within the file system of the virtual machine, a Snap Copy Ref column 716 that contains a reference or pointer to snapshot copies of each virtual disk or PRDM-mapped LUN (and may contain additional information such as the time a snapshot copy was taken or the type of snapshot copy taken), and an Other Copy Ref column 718 that contains a reference or pointer to other types of copies of each virtual disk or PRDM-mapped LUN such as backup or auxiliary copies (and may contain additional information such as the type of copy or the time a copy was created or updated). For example, rows 702 and 704 indicate that the management component 254 has discovered a virtual machine identified as "VM_1" that has a virtual disk identified as "VD_1" that is mounted at drive location "C:/" and a PRDM-mapped LUN identified as "PL_1" that is mounted at drive location "D:/."

At block 415, the management component 254 takes snapshots of the virtual disks of the virtual machine. For example, the management component 254 may instruct the virtual machine's host 105 or the virtual machine manager 150 to take a snapshot of each of the virtual disks of the virtual machine via an API. At block 420, the management component 254 takes a snapshot of each PRDM-mapped LUN. For example, the management component 254 may instruct a hardware or software component of an external storage array to take a snapshot of the PRDM-mapped LUN. As another example, the management component 254 may instruct the virtual machine via an API to initiate a snapshot of the PRDM-mapped LUN. After snapshots are taken of the virtual disks and PRDM-mapped LUNs, the management component 254 may update a virtual machine tracking data structure 700, so that the data structure associates the virtual machine with an identifier, location, reference or pointer to each snapshot taken. For example, as shown in rows 702 and 704 of FIG. 7, the management component may indicate that a snapshot of the virtual disk identified as "VD_1" can be located using the reference or pointer "VD_1_snap*," and a snapshot of the PRDM-mapped LUN identified as "PL_1" can be can be located using the reference or pointer "PL_1_snap*."

After block 420, the process 400 may take one or both of two different branches. The branch or branches that are taken may be determined by whether an administrator wants to effectuate an in-place reversion or a restoration to a new machine. In one branch, represented by block 425, the management component 254 preserves the snapshots taken at blocks 415 and 420 to permit the virtual machine to be reverted in place, i.e. on the same virtual machine host 105. In the other branch, represented by block 430, the management component 254 uses the snapshots to create or update one or more additional non-production copies of the virtual machine and its associated data and metadata, which may be performed using a process such as the process 500 described herein with respect to FIG. 5. After additional copies are created or updated, the management component 254 may update a virtual machine tracking data structure 700, so that the data structure associates the virtual machine with an identifier, location, reference or pointer to each additional copy created or updated. For example, as shown in rows 702 and 704 of FIG. 7, the management component may indicate that a backup copy of the virtual disk identified as "VD_1" can be located using the reference or pointer "VD_1_bu*," and a backup of the PRDM-mapped LUN identified as "PL_1" can be can be located using the reference or pointer "PL_1_bu*." The process 400 concludes at block 435, where the management component 254 uses the snapshots and/or additional non-production copies to revert or restore the virtual machine, which may be performed using the processes described herein with respect to FIGS. 6A and 6B. The process 400 then concludes.

Figure 5:
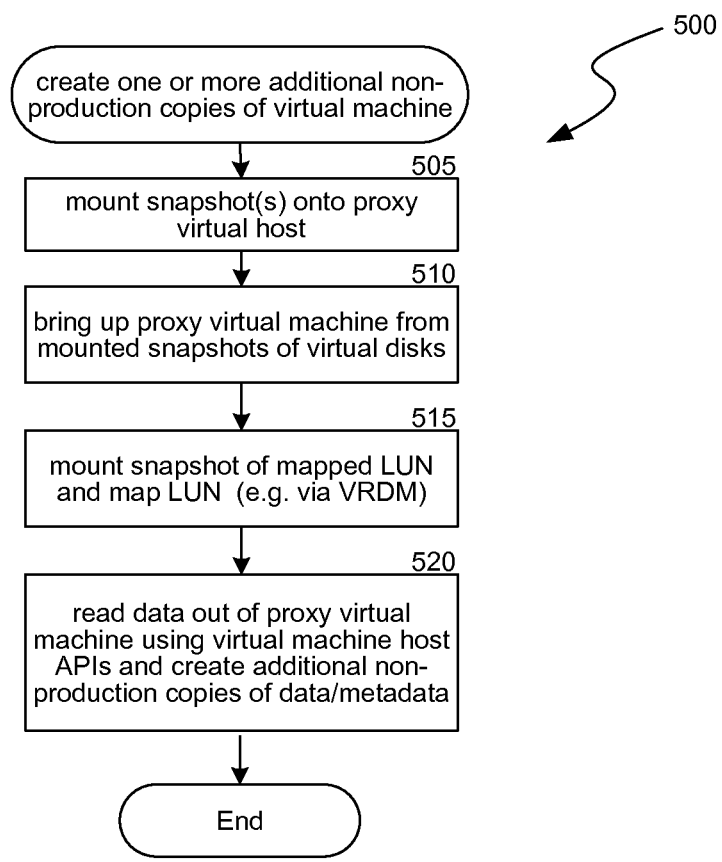
FIG. 5 is a flow diagram illustrating a process for creating one or more additional non-production copies of a virtual machine's data and metadata from snapshots.

FIG. 5 shows a process 500 for creating one or more additional non-production copies of a virtual machine's data and metadata from snapshots. The process 500 may be performed by the management component 254 or another component. The process 500 begins at block 505, where the management component 254 mounts snapshots taken of a virtual machine's virtual disks onto a proxy virtual machine host 105. The proxy virtual machine host is typically a virtual machine host 105 different than the virtual machine host that originally hosted the virtual machine. At block 510, the management component 254 brings up an instance of the virtual machine (a "proxy virtual machine") from the mounted virtual disk snapshot images, e.g., via API calls to the proxy virtual machine host.

At block 515, the management component 254 mounts the snapshot of each PRDM-mapped LUN on the proxy virtual host. Using API calls to the proxy virtual host 105, a virtual machine manager 150, and/or the proxy virtual machine, the management component maps each mounted snapshot of a PRDM-mapped LUN to the proxy virtual machine, but via a virtual RDM instead of a physical RDM. Each snapshot may be mounted at the same mount point where the corresponding virtual disk or PRDM-mapped LUN was previously mounted. The mount points may be determined using virtual machine tracking data structure 700. For example, if a PRDM-mapped LUN was previously mapped to the D:/drive of the virtual machine VM_1 as shown in row 704, a new VRDM-mapped LUN will be mapped to the D:/drive of the created proxy virtual machine. Thus, effectively, what was a PRDM-mapped LUN on the original virtual machine is instead converted into a VRDM-mapped LUN on the proxy virtual machine at the same drive location or mount point. Doing so permits the proxy virtual machine and proxy virtual machine host to perform actions such as taking snapshots of the VRDM-mapped LUN.

At block 520, using virtual machine host APIs or an installed information management agent, the management component 254 reads data and metadata out of the proxy virtual machine's virtual disks and VRDM-mapped LUNs that were mounted at blocks 505-520. The information management agent uses the read data and metadata to perform information management operations (e.g., backup operations or archive operations) that create additional non-production copies of the data and metadata, e.g., as described in commonly-assigned U.S. patent application Ser. No. 12/553,294, filed Sep. 3, 2009, entitled "SYSTEMS AND METHODS FOR MANAGEMENT OF VIRTUALIZATION DATA," now U.S. Patent Publication No. 2010/0070725, which is incorporated by reference above. For example, the management component 254 may create a backup copy or archive copy of the data and metadata on a non-production storage medium such as tape. The process 500 then ends. By using VRDM mappings and API calls to a proxy host, the process 500 can avoid installing information management agents directly onto virtual machines when creating backup or other non-production copies of PRDM-mapped LUNs.

Figure 6A:
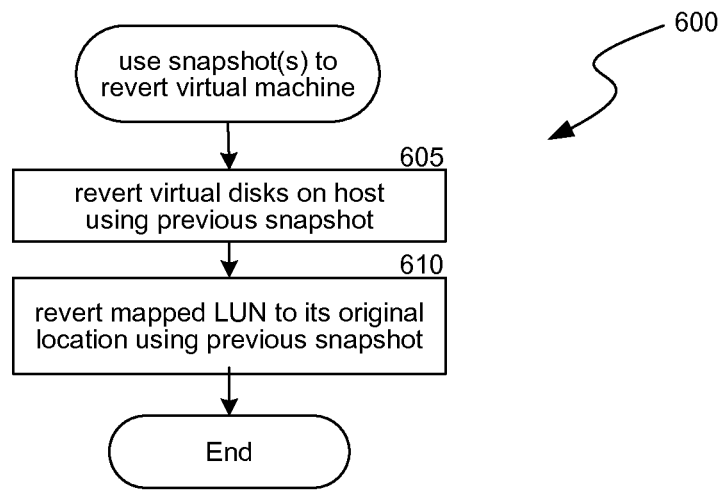
FIG. 6A shows a process for using snapshots to revert a virtual machine having a mapped LUN to an earlier point in time.

FIG. 6A shows a process 600 for using snapshots to revert a virtual machine having a PRDM-mapped LUN to an earlier point in time. The process 600 may be performed by the management component 254 or another component. The process begins at block 605, where the management component 254 reverts the virtual machine's virtual disks to an earlier state using a previously-acquired snapshot of the virtual disks, e.g. via API calls to the virtual machine host 105. At block 610, the management component 254 reverts the PRDM-mapped LUN in its original location using a previously acquired snapshot of the PRDM-mapped LUN. For example the management component 254 may instruct a hardware or software component of an external storage array to use a previous snapshot of the PRDM-mapped LUN in order to revert the PRDM-mapped LUN to an earlier state. Generally, no further reconfiguration of the reverted virtual machine is needed. The process 600 then ends.

Figure 6B:
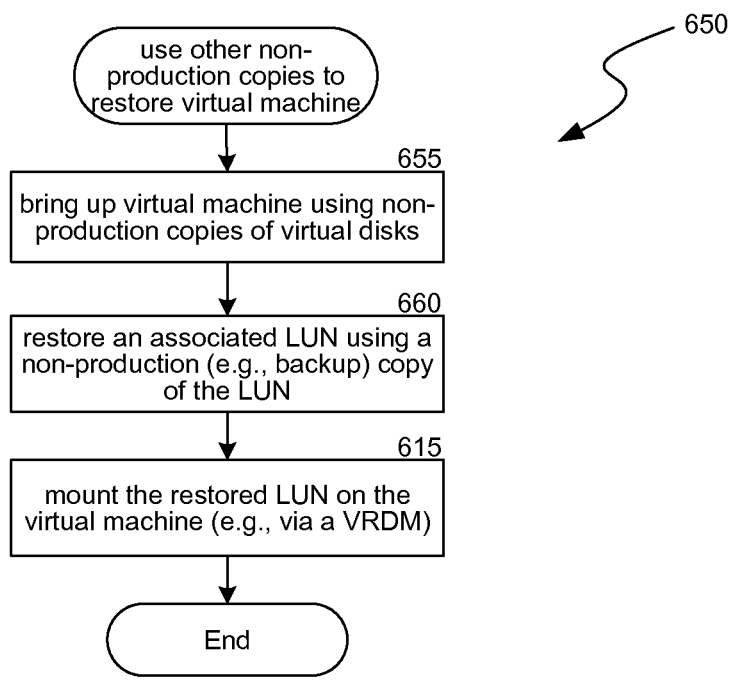
FIG. 6B shows a process for using non-production copies to restore a virtual machine that has one or more mapped LUNs.

FIG. 6B shows a process 650 for using non-production copies other than snapshots to restore a virtual machine that has one or more PRDM-mapped LUNs. The process 650 may be performed by the management component 254 or another component and may be used in conjunction with the DR testing-related processes described herein, such as the process 300 of FIG. 3 and its variants, in order to perform DR testing of virtual machines. The process 650 begins at block 655, where the management component 254 brings up a new instance of the virtual machine using non-production copies of the machine's virtual disks. For example, the management component 254 may use a virtual machine tracking data structure 700 to identify the location or identifiers of non-production copies of the machine's virtual disks, such as backup or archive copies stored in a non-production storage medium. The management component 254 may then use the identified non-production copies of the virtual disks to restore virtual disk files to a virtual machine host 105, e.g., using conventional data restoration methods and API calls to the host or a storage manager, or using the techniques described in commonly-assigned U.S. patent application Ser. No. 12/553,294, filed Sep. 3, 2009, entitled "SYSTEMS AND METHODS FOR MANAGEMENT OF VIRTUALIZATION DATA," now U.S. Patent Publication No. 2010/0070725, which is incorporated by reference above. The management component 254 may then bring up the virtual machine on the virtual machine host using API calls to the host or a virtual machine manager 150.

At block 660, the management component 254 restores any associated LUNs that were previously associated with the virtual machine to a storage array or other external storage device using non-production copies of the LUNs. For example, the management component 254 may look up, in a virtual machine tracking data structure 700, identifiers or locations for PRDM-mapped LUNs that were previously associated with the virtual machine and/or identifiers or locations of non-production copies of those PRDM-mapped LUNs (e.g., that were created using the process of FIG. 5). Using the identified non-production copies of the PRDM-mapped LUNs, the management component 254 may then restore the LUNs' data and metadata into a storage array or other external storage device using conventional restoration techniques. At block 615, the management component 254 mounts each restored LUN on the virtual machine via a virtual RDM, typically to the same mount point where the corresponding physical RDM had been previously mounted. For example, the management component 254 may instruct the virtual machine host 105 or a virtual machine manager 150 to create a new virtual RDM between the restored virtual machine and the restored LUN using a mount point determined from a virtual machine tracking data structure. The process 650 then ends.

Information Management Environment

Figure 8:
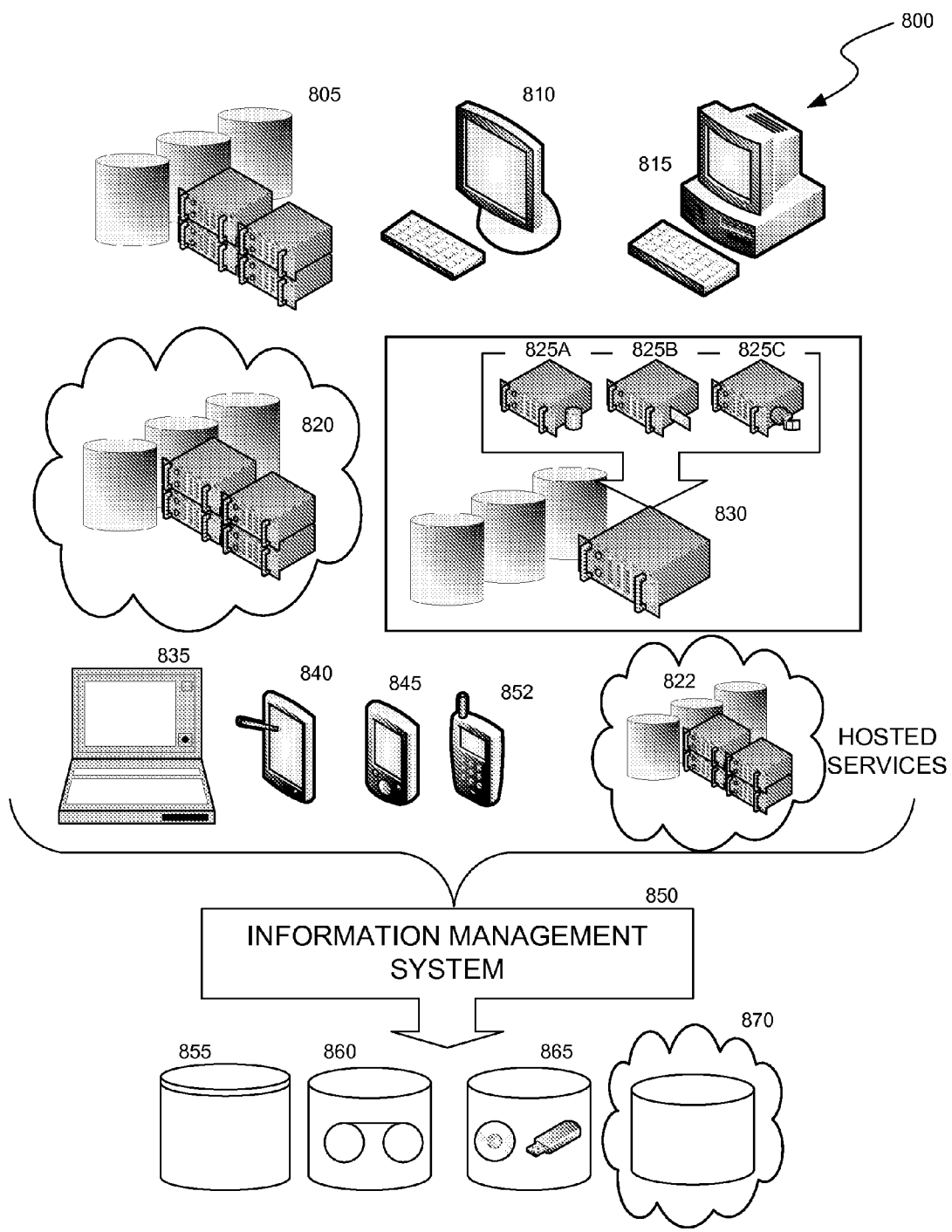
FIG. 8 is a block diagram illustrating an example of a suitable information management environment in which aspects of the inventive systems and methods may operate.

Aspects of the technologies described herein may be practiced in an information management environment 800, which will now be described while referencing FIG. 8. As shown in FIG. 8, the environment 800 includes multiple computing devices that execute numerous software applications to facilitate the operations of an organization (or multiple affiliated organizations), such as a household, corporation or other business entity, a non-profit organization, an educational institution, or a governmental agency. The computing devices may include one or more: servers 805 (such as mail servers, file servers, database servers, print servers, and web servers), personal computers 810, workstations 815, or other types of fixed computing systems such as mainframe computers and minicomputers (not shown). The servers 805 may include network-attached storage (NAS) filers.

The environment 800 may include virtualized computing resources, such as a virtual machine 820 provided to the organization by a third-party cloud service vendor or a virtual machine 825 running on a virtual machine host 830 operated by the organization. For example, the organization may use one virtual machine 825A as a database server and another virtual machine 825B as a mail server. The environment 800 may also include mobile or portable computing devices, such as laptops 835, tablet computers 840, personal data assistants 845, mobile phones 852 (such as smartphones), and other mobile or portable computing devices such as embedded computers, set top boxes, vehicle-mounted devices, wearable computers, etc.

Of course, other types of computing devices may form part of the environment 800. As part of their function, each of these computing devices creates, accesses, modifies, writes, and otherwise uses production copies of data and metadata that are typically stored in a persistent storage medium having fast I/O times. For example, each computing device may regularly access and modify data files and metadata stored on semiconductor memory, a local disk drive or a network-attached storage device. Each of these computing devices may access data and metadata via a file system supported by an operating system of the computing device.

The environment 800 may also include hosted services 822 that provide various online services to the organization or its constituent members (e.g., the organization's departments, employees, independent contractors, etc.) such as social networking services (e.g., Facebook, Twitter, Pinterest), hosted email services (e.g., Gmail, Yahoo Mail, Hotmail), or hosted productivity applications or other hosted applications (e.g., Microsoft Office 365, Google Docs, Salesforce.com). Hosted services may include software-as-a-service (SaaS), platform-as-a-service (PaaS), application service providers (ASPs), cloud services, and all manner of delivering computing or functionality via a network. As it provides services to users, each hosted service may generate additional "hosted data and metadata" that is associated with each user. For example, Facebook may generate and store photos, wall posts, notes, videos, and other content that are associated with a particular Facebook user's account.

The organization directly or indirectly employs an information management system 850 to protect and manage the data and metadata used by the various computing devices in the environment 800 and the data and metadata that is maintained by hosted services on behalf of users associated with the organization. One example of an information management system is the CommVault Simpana system, available from CommVault Systems, Inc. of Oceanport, N.J. The information management system creates and manages non-production copies of the data and metadata to meet information management goals, such as: permitting the organization to restore data, metadata or both data and metadata if an original copy of the data/metadata is lost (e.g., by deletion, corruption, or disaster, or because of a service interruption by a hosted service); allowing data to be recovered from a previous time; complying with regulatory data retention and electronic discovery ("e-discovery") requirements; reducing the amount of data storage media used; facilitating data organization and search; improving user access to data files across multiple computing devices and/or hosted services; and implementing information lifecycle management ("ILM") or other data retention policies for the organization. The information management system 850 may create the additional non-production copies of the data and metadata on any suitable non-production storage medium such as magnetic disks 855, magnetic tapes 860, other storage media 865 such as solid-state storage devices or optical disks, or on cloud data storage sites 870 (e.g. those operated by third-party vendors). Further details on the information management system may be found in the assignee's U.S. patent application Ser. No. 12/751,850, filed Mar. 31, 2010 entitled DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES, now U.S. Patent Publication No. 2010/0332456, which is hereby incorporated by reference herein in its entirety.

Figure 9:
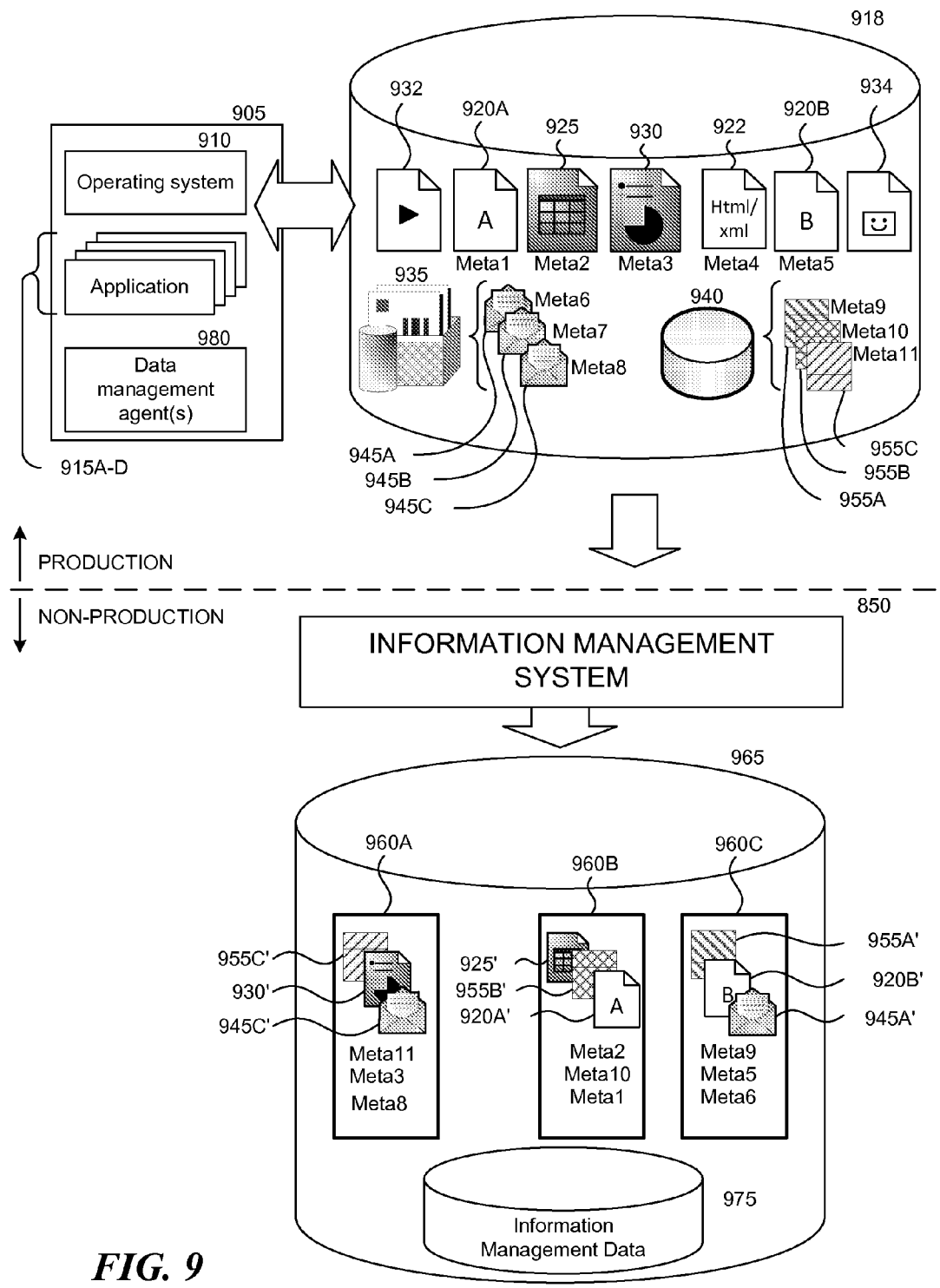
FIG. 9 illustrates examples of production and non-production data that may be processed by the information management environment of FIG. 8.

FIG. 9 helps illustrates some differences between "production copies" of data and metadata and "non-production copies" of data and metadata in the data management environment 800. As shown, each computing device 905 in the environment 800 has at least one operating system 910 installed and one or more applications 915A-D, such as mail server applications, file server applications, mail client applications, database applications, word processing applications, spreadsheet applications, presentation applications, browser applications, mobile applications, entertainment applications, and so on. Each application can access and modify various production copies of files stored in a production data storage medium 918, which may be a network attached storage filer or form part of a Hadoop distributed file system, Open VMS file system, or other type of distributed file system, simply by making conventional file system calls via the operating system 910, without needing the information management system 850 to intervene on behalf of the operating system or application. The production copies of files may include structured data (e.g., database files), unstructured data (e.g., documents), and/or semi-structured data, and thus may include one or more documents 920A-B, spreadsheets 925, presentation documents 930, video files 932, image files 934, email mailboxes 935, html/xml or other types of markup language files 922, and/or databases 940. The operating system 910 may also access and modify production copies of files and other data, such as files in a system volume and/or boot volume. The hosted data and metadata used by a hosted service are also "production copies" of data and metadata since the hosted service accesses and modifies the user's data and metadata as part of its services. Production copies of data may include not only files, but also subsets of files, each of which a related application 915 or the operating system 910 treats as an independent functional unit, but which is not separately addressed in the associated file system. For example, a single email mailbox 935 may include multiple email messages 945A-C, email headers, and attachments. As another example, a single database 940 may include multiple tables 955A-C. As used herein, a "data object" refers to both (1) any file that is currently or previously addressable by a file system and (2) a functional subset of such a file that has a particular function for a related application 915A-D or the operating system 910. Each data object may be further decomposed into one or more data blocks each of which is a collection of data bits within the data object that may not have any particular function for a related application or the operating system. In addition to data objects, the operating system 910 and applications 915A-D may also access and modify production copies of metadata, such as boot sectors, partition layouts, file or data object metadata (e.g., file name, file size, creation/modification/access timestamps, file location within a file folder directory structure, user permissions, owners, groups, access control lists ("ACLs")), and system metadata (e.g., registry information). In addition to metadata generated by or related to file systems and operating systems, some applications maintain indices of production metadata for data objects, e.g., metadata associated with individual email messages. Thus, as shown in FIG. 9, each data object may be associated with a production copy of object metadata ("Meta1-11"), which may be file system metadata and/or application-specific metadata.

The information management system 850 accesses or receives copies of the various production copies of data objects and metadata, and via an information management operation (such as a backup operation, archive operation, or snapshot operation), creates non-production copies of these data objects and metadata, often stored in one or more non-production storage mediums 965 different than the production storage medium 918 where the production copies of the data objects and metadata reside. A non-production copy of a data object represents the production data object and its associated metadata at a particular point in time (non-production objects 960A-C). Since a production copy of a data object or metadata changes over time as it is modified by an application 915, hosted service 822, or the operating system 910, the information management system 850 may create and manage multiple non-production copies of a particular data object or metadata, each representing the state of the production data object or metadata at a particular point in time. Moreover, since a production copy of a data object may eventually be deleted from the production data storage medium and the file system from which it originated, the information management system may continue to manage point-in-time representations of that data object, even though a production copy of the data object itself no longer exists.

For virtualized computing devices, such as virtual machines, the operating system 910 and applications 915A-D may be running on top of virtualization software, and the production data storage medium 918 may be a virtual disk created on a physical medium such as a physical disk. The information management system may create non-production copies of the discrete data objects stored in a virtual disk file (e.g., documents, email mailboxes, and spreadsheets) and/or non-production copies of the entire virtual disk file itself (e.g., a non-production copy of an entire .vmdk file).

Each non-production object 960A-C may contain copies of or otherwise represent more than one production data object. For example, non-production object 960A represents three separate production data objects 955C, 930 and 945C (represented as 945C', 930' and 945', respectively). Moreover, as indicated by the prime mark ('), a non-production object may store a representation of a production data object or metadata differently than the original format of the data object or metadata, e.g., in a compressed, encrypted, deduplicated, or otherwise optimized format. Although FIG. 9 shows that a single production data object (e.g., 955C), and its associated data object metadata (e.g., Meta11) are represented by the contents of only a single non-production object (e.g., 960A), the entire contents of a single production data object and/or its metadata at a particular point in time may instead span across numerous non-production objects. Also a single non-production object 960 may contain copies of or otherwise represent production data objects that originated from different computing devices.

Non-production copies include backup copies, archive copies, and snapshot copies. Backup copies are generally used for shorter-term data protection and restoration purposes and may be in a native application format or in a non-native format (e.g., compressed, encrypted, deduplicated, and/or otherwise modified from the original application format). Archive copies are generally used for long-term data storage purposes and may be compressed, encrypted, deduplicated and/or otherwise modified from the original application format. In some examples, when an archive copy of a data object is made, a logical reference or stub may be used to replace the production copy of the data object in the production storage medium 918. In such examples, the stub may point to or otherwise reference the archive copy of the data object stored in the non-production storage medium so that the information management system can retrieve the archive copy if needed. The stub may also include some metadata associated with the data object, so that a file system and/or application can provide some information about the data object and/or a limited-functionality version (e.g., a preview) of the data object. A snapshot copy represents a data object at a particular point in time. A snapshot copy can be made quickly and without significantly impacting production computing resources because large amounts of data need not be copied or moved. A snapshot copy may include a set of pointers derived from the file system or an application, where each pointer points to a respective stored data block, so collectively, the set of pointers reflect the storage location and state of the data object at a particular point in time when the snapshot copy was created. In "copy-on-write", if a block of data is to be deleted or changed, the snapshot process writes the block to a particular data storage location, and the pointer for that block is now directed to that particular location. The set of pointers and/or the set of blocks pointed to by a snapshot may be stored within the production data storage medium 918.

Non-production copies of a data object or metadata may be distinguished from a production copy of a data object or metadata in several ways. First, a non-production copy of a data object is created to meet the different information management goals described above and is not directly used or modified by applications 915A-D, hosted services 822, or the operating system 910. Second, a non-production copy of a data object is stored as one or more non-production objects 960 that may have a format different from the native application format of the production copy of the data object, and thus often cannot be directly used by the native application or a hosted service 822 without first being modified. Third, non-production objects are often stored on a non-production storage medium 965 that is inaccessible to the applications 915A-D running on computing devices and hosted services 822. Also, some non-production copies may be "offline copies," in that they are not readily available (e.g. not mounted tape or disk.) Offline copies include copies of data that the information management system can access without any human intervention (e.g. tapes within an automated tape library, but not yet mounted in a drive), and copies that the information management system 850 can access only with at least some human intervention (e.g. tapes located at an offsite storage site).

The information management system 850 also generates information management data 975, such as indexing information, that permit the information management system to perform its various information management tasks. As shown in FIG. 9, a computing device 905 may include one or more data management agents 980 that provide client-side functions for the information management system.

Information Management System

Figure 10:
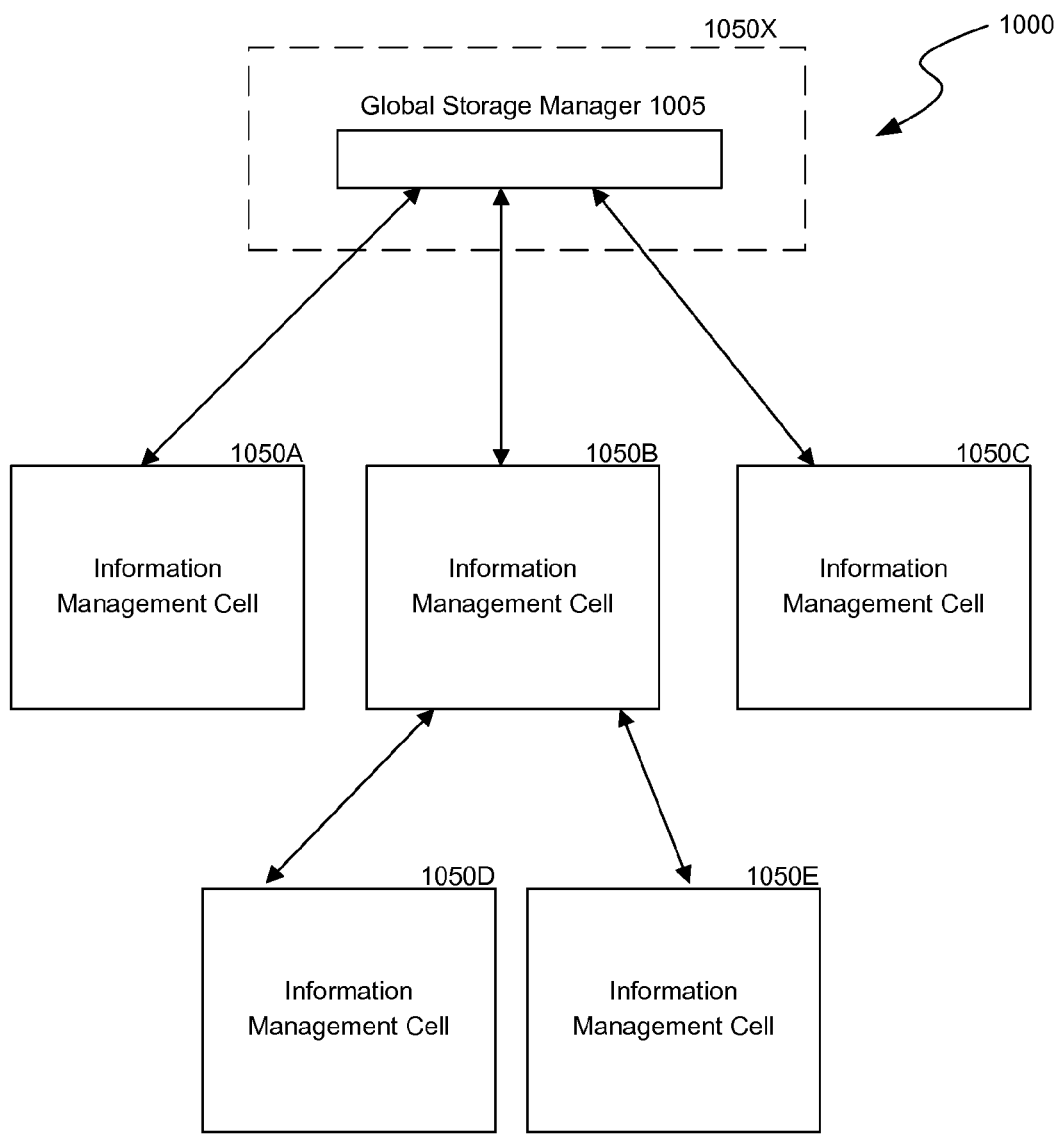
FIG. 10 is a block diagram illustrating one example of a hierarchical arrangement of resources for the information management system of FIG. 8, including information management cells.

FIG. 10 shows a hierarchical arrangement of resources that may form an information management system 850. As shown, the information management system 850 includes multiple information management cells 1050 arranged in a hierarchy, with some information management cells (e.g., 1050D-E) subordinate to other information management cells (e.g., 1050B). A global storage manager 1005, which may form part of a global information cell 1050x, manages the overall hierarchy of information management cells by receiving reports from the various subordinate information management cells related to the operation of the cells, determining global information management policies in light of received reports, and pushing information management policies towards subordinate cells for implementation. The global storage manager may also maintain and disseminate, to the various cells, system-wide information management data. A superior information management cell (e.g., 1050B), may perform similar tasks for its subordinate cells (e.g., 1050D-E) and/or otherwise act as an intermediary between the subordinate cells and the global storage manager 1005.

Information Management Cell

Figure 11:
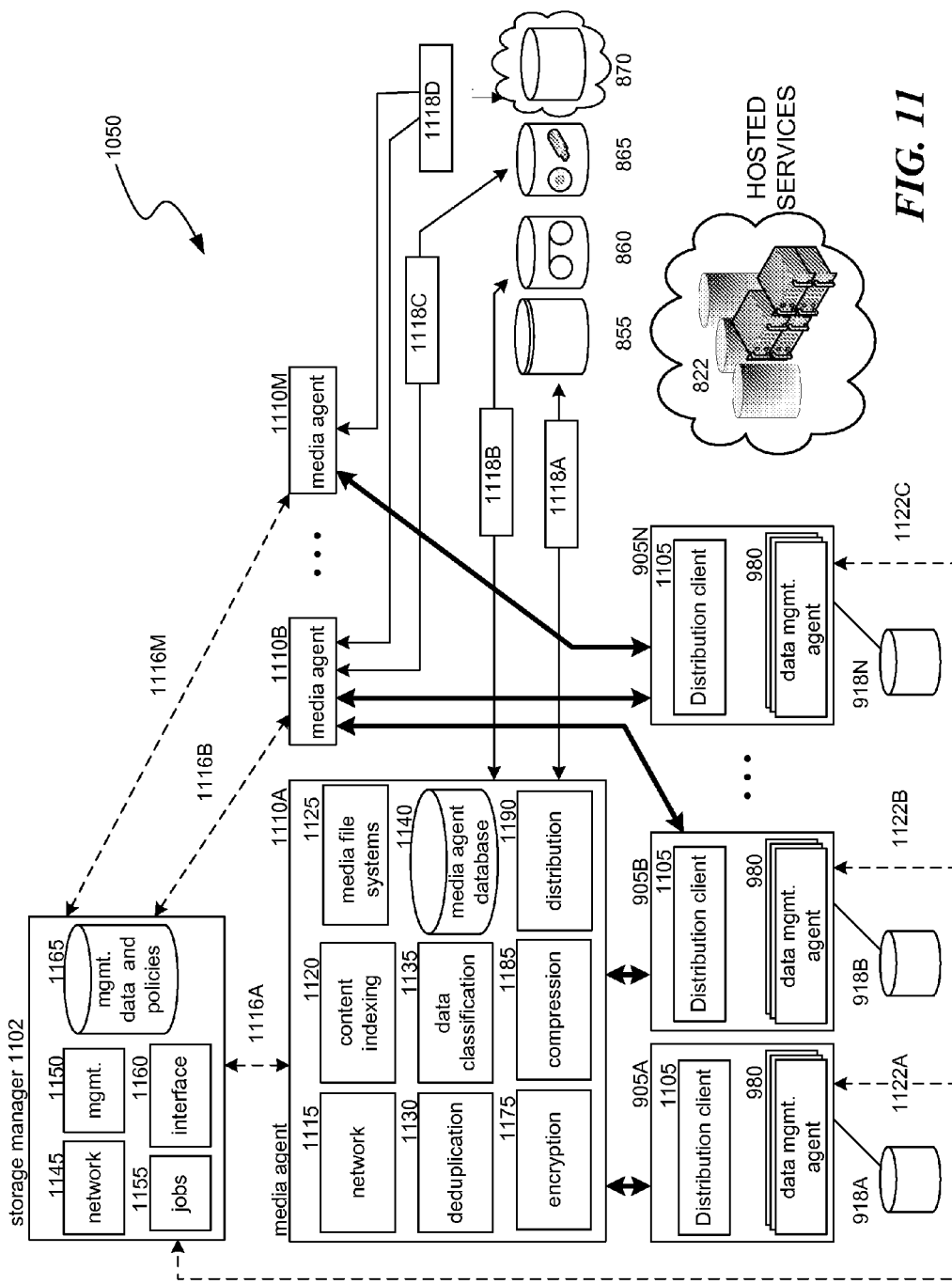
FIG. 11 is a block diagram illustrating an example of resources forming an information management cell.

FIG. 11 shows an arrangement of resources that may form an information management cell 1050. As shown, the information management cell includes a storage manager 1102, one or more media agents 1110A-M, one or more non-production storage mediums 855-870, one or more computing devices 905A-N, and one or more production data storage mediums 918A-N. Outside of the information management cell are hosted services 822, which may interact with media agents 1110 and its components, as described further herein. In some examples, all or a portion of an information management cell may be implemented as an object store, as described in assignee's U.S. patent application Ser. No. 12/751,850, which is incorporated by reference above.

The storage manager 1102 may be a software module or other application that coordinates and controls information management operations performed by one or more information management cells 1050 to protect and control copies of non-production data objects and metadata. As shown by the dashed lines 1116 and 1122, the storage manager may communicate with some or all elements of the information management cell 1050, such as the media agents 1110 and computing devices 905, to initiate and manage backup operations, snapshot operations, archive operations, data replication operations, data migrations, data distributions, data recovery, and other information management operations. The storage manager may control additional information management operations including ILM, deduplication, content indexing, data classification, data mining or searching, e-discovery management, collaborative searching, encryption, and compression. Alternatively or additionally, a storage manager may control the creation and management of disaster recovery copies, which are often created as secondary, high-availability disk copies, using auxiliary copy or replication technologies.

The storage manager 1102 may include a jobs agent 1155, a management agent 1150, a network agent 1145, and an interface agent 1160, all of which may be implemented as interconnected software modules or application programs. The jobs agent 1155 monitors the status of information management operations previously performed, currently being performed, or scheduled to be performed by the information management cell 1050. The management agent 1150 provides an interface that allows various management agents 1150 in multiple information management cells 1050 (or in a global storage manager 1005) to communicate with one another. This allows each information management cell 1050 to exchange status information, routing information, capacity and utilization information, and information management operation instructions or policies with other cells. In general, the network agent 1145 provides the storage manager 1102 with the ability to communicate with other components within the information management cell and the larger information management system, e.g., via proprietary or non-proprietary network protocols and application programming interfaces ("APIs") (including HTTP, HTTPS, FTP, REST, virtualization software APIs, cloud service provider APIs, hosted service provider APIs). The interface agent 1160 includes information processing and display software, such as a graphical user interface ("GUI"), an API, or other interactive interface through which users and system processes can retrieve information about the status of information management operations or issue instructions to the information management cell and its constituent components. The storage manager 1102 may also track information that permits it to select, designate, or otherwise identify content indices, deduplication databases, or similar databases within its information management cell (or another cell) to be searched in response to certain queries.

The storage manager 1102 may also maintain information management data, such as a database 1165 of management data and policies. The database 1165 may include a management index that stores logical associations between components of the system, user preferences, user profiles (that among other things, map particular information management users to computing devices or hosted services), management tasks, or other useful data. The database 1165 may also include various "information management policies," which are generally data structures or other information sources that each includes a set of criteria and rules associated with performing an information management operation. The criteria may be used to determine which rules apply to a particular data object, system component, or information management operation, an may include:

- frequency with which a production or non-production copy of a data object or metadata has been or is predicted to be used, accessed, or modified;
- access control lists or other security information;
- the sensitivity (e.g., confidentiality) of a data object as determined by its content and/or metadata;
- time-related factors;
- deduplication information;
- the computing device, hosted service, computing process, or user that created, modified, or accessed a production copy of a data object; and
- an estimated or historic usage or cost associated with different components.

The rules may specify, among other things:

- a schedule for performing information management operations,
- a location (or a class or quality of storage media) for storing a non-production copy,
- preferences regarding the encryption, compression, or deduplication of a non-production copy,
- resource allocation between different computing devices or other system components (e.g., bandwidth, storage capacity),
- whether and how to synchronize or otherwise distribute files or other data objects across multiple computing devices or hosted services,
- network pathways and components to utilize (e.g., to transfer data) during an information management operation, and
- retention policies (e.g., the length of time a non-production copy should be retained in a particular class of storage media).

As noted above, each computing device 905 may include one or more data management agents 980. Each data management agent is a software module or component that helps govern communications with other system components. For example, the data management agent receives commands from the storage manager 1102 and sends to and receives from media agents 1110 copies of data objects, metadata, and other payload (as indicated by the heavy arrows). Each data management agent accesses data and/or metadata stored in a production data storage medium 918 and arranges or packs the data and metadata in a certain format (e.g., backup or archive format) before it is transferred to another component. Each data management agent can also restore a production copy of a data object or metadata in a production data storage medium 918 from a non-production copy. A data management agent may perform some functions provided by a media agent, which are described further herein, such as compression, encryption, or deduplication. Each data management agent may be specialized for a particular application (e.g. a specified data management agent customized to handle data generated or used by Exchange by Microsoft Corp.). Alternatively or additionally, a more generic data management agent may handle data generated or used by two or more applications.

Each computing device 905 may also include a data distribution and live browsing client module 1105 (herein "distribution client module"). The distribution client module 1105 is responsible for, inter alia, associating mobile devices and/or hosted service accounts with users of the information management system, setting information management policies for mobile and other computing devices, pushing data objects to a distribution module for distribution to other computing devices, providing unified access to a user's data via an interface, and providing live browsing features. The various functions of the distribution client module are described in greater detail herein.

A media agent 1110, which may be implemented as a software module, conveys data, as directed by the storage manager 1102, between a computing device 905 (or hosted service 822) and one or more non-production storage mediums 855-870. Each media agent 1110 may control one or more intermediary storage devices 1118, such as a cloud server or a tape or magnetic disk library management system, to read, write, or otherwise manipulate data stored in a non-production storage mediums 855-870. Each media agent 1110 may be considered to be "associated with" a storage device and its related non-production storage media if that media agent is capable of routing data to and storing data in the storage media managed by the particular storage device. A media agent may communicate with computing devices 905, hosted services 822, storage devices 1118A-D, and the storage manager 1102 via any suitable communications path, including SCSI, a Storage Area Network ("SAN"), a Fibre Channel communications link, or a wired, wireless, or partially wired/wireless computer or telecommunications network, including the Internet.

To perform its functions, the media agent 1110 may include a media file system module 1125, a data classification module 1135, a content indexing module 1120, a deduplication module 1130, an encryption module 1175, a compression module 1185, a network module 1115, a distribution module 1190, and a media agent database 1140. The media file system module 1125 is responsible for reading, writing, archiving, copying, migrating, restoring, accessing, moving, sparsifying, deleting, sanitizing, destroying, or otherwise performing file system operations on various non-production storage devices of disparate types. The media file system module may also instruct the storage device to use a robotic arm or other retrieval means to load or eject certain storage media such as a tape.

The network module 1115 permits the media agent to communicate with other components within the system and hosted services 822 via one or more proprietary and/or non-proprietary network protocols or APIs (including cloud service provider APIs, virtual machine management APIs, and hosted service provider APIs). The deduplication module 1130 performs deduplication of data objects and/or data blocks to reduce data redundancy in the cell. The deduplication module may generate and store data structures to manage deduplicated data objects, such as deduplication tables, in the media agent database 1140. The encryption module 1175 performs encryption of data objects, data blocks, or non-production objects to ensure data security in the cell. The compression module 1185 performs compression of data objects, data blocks, or non-production objects to reduce the data capacity needed in the cell.

The content indexing module 1120 analyzes the contents of production copies or non-production copies of data objects and/or their associated metadata and catalogues the results of this analysis, along with the storage locations of (or references to) the production or non-production copies, in a content index stored within a media agent database 1140. The results may also be stored elsewhere in the system, e.g., in the storage manager 1102, along with a non-production copy of the data objects, and/or an index cache. Such index data provides the media agent 1110 or another device with an efficient mechanism for locating production copies and/or non-production copies of data objects that match particular criteria. The index data or other analyses of data objects or metadata may also be used by the data classification module 1135 to associate data objects with classification identifiers (such as classification tags) in the media agent database 1140 (or other indices) to facilitate information management policies and searches of stored data objects.

The distribution module 1190 may be a set of instructions that coordinates the distribution of data objects and indices of data objects. The distribution may occur from one computing device 905 to another computing device 905 and/or from hosted services 822 to computing devices 905. As a first example, the distribution module may collect and manage data and metadata from hosted services 822 or mobile devices 905. As another example, the distribution module may synchronize data files or other data objects that are modified on one computing device so that the same modified files or objects are available on another computing device. As yet another example, the distribution module may distribute indices of data objects that originated from multiple computing devices and/or hosted services, so a user can access all of their data objects through a unified user interface or a native application on their computing device. The distribution module may also initiate "live browse" sessions to permit communications between different computing devices so that the devices can interchange data and metadata or so the devices can provide computing resources, such as applications, to each other. The functions performed by the distribution module are described in greater detail herein.

CONCLUSION

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other computing devices suitable for the purposes described herein. Modules described herein may be executed by a general-purpose computer, e.g., a server computer, wireless device, or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Furthermore, aspects of the invention can be embodied in a special purpose computer or data processor that is specifically programmed, configured, or constructed to perform one or more of the computer-executable instructions explained in detail herein.

Software and other modules may be accessible via local memory, a network, a browser, or other application in an ASP context, or via another means suitable for the purposes described herein. Examples of the technology can also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Examples of the technology may be stored or distributed on computer-readable media, including magnetically or optically readable computer disks, hard-wired or preprogrammed chips (e.g., EEPROM semiconductor chips), nanotechnology memory, or other data storage media. Indeed, computer-implemented instructions, data structures, screen displays, and other data under aspects of the invention may be distributed over the Internet or over other networks (including wireless networks), or they may be provided on any analog or digital network (packet switched, circuit switched, or other scheme).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," any variant thereof, means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the systems described herein. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, concepts of the various references described above to provide yet further implementations of the invention.

These and other changes can be made to the invention in light of the above Detailed Description. While the above description describes certain examples of the invention, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to pursue additional claims after filing this application to pursue such additional claim forms, in either this application or in a continuing application.

We claim:

1. At least one tangible non-transitory computer-readable storage medium storing instructions, which when executed by at least one data processing device perform a method for migrating functionality of a source physical computing device to a destination virtual machine, the method comprising:

identifying a non-production copy of data and metadata associated with a source physical computing device,
wherein the non-production copy is stored on one or more non-production storage media separate from the source physical computing device and separate from the destination virtual machine,
determining a configuration of the source physical computing device;
determining or establishing a desired configuration for a destination virtual machine,
wherein the configuration is based at least in part on the determined configuration of the source physical computing device;
creating a virtual machine based on the determined configuration of the source physical computing device;
providing the virtual machine with access to the one or more non-production storage media to thereby access the data and metadata from the non-production copy of data and metadata associated with the source physical computing device,
wherein the data and metadata from the non-production copy includes application-specific data and metadata;
modifying a configuration of the virtual machine based at least in part on the determined or established configuration for the destination virtual machine,
wherein modifying the virtual machine comprises modifying a configuration of the virtual machine to substantially match the determined or established configuration for the destination virtual machine;
following the modifying, updating a mapping of an IP address of the source physical computing device, the destination virtual machine, or both the source physical computing device and destination virtual machine,
such that client computing devices are directed or routed to the destination virtual machine instead of the source physical computing following the modifying, and
such that, the source physical computing device is decommissionable after migration is complete, and
wherein the source physical computing device is inoperable after being decommissioned; and
disposing of the source physical computing device following decommissioning, including permanently wiping data and metadata stored on the source physical computing device, and notifying a server associated with an intranet site or auction site that the source physical computing device is available for use by other users in an organization or for sale to external parties,
wherein the notification includes a description or specification of the source physical computing device.

2. The computer-readable storage medium of claim 1, wherein the migration method is initiated in response to determining that the source physical computing device has lost some of its data redundancy protection or a disk drive, or the source physical computing device has been infected by a virus.

3. The computer readable storage medium of claim 1, wherein the method is initiated in response to determining that the source physical computing device has experienced an increase in frequency of errors or in response to determining that the source physical computing device has presented symptoms indicative of system instability.

4. The computer-readable storage medium of claim 1, further comprising updating existing IP address mapping from the source physical machine to the destination virtual machine; and, applying existing information management policies from the source physical machine to the destination virtual machine.

5. The computer-readable storage medium of claim 1, wherein the virtual machine is created by repurposing an existing virtual machine, and further comprising using another snapshot to revert the virtual machine to an earlier point in time, wherein the virtual machine has a physical compatibility mode raw device mapped logical unit number (LUN).

6. The computer-readable storage medium of claim 1, further comprising performing information management operations on the production data of the destination virtual machine; restoring or otherwise providing production data to the destination virtual machine from a non-production copy of the data; and installing application binaries to the destination virtual machine based on applications determined on the source physical computing device.

7. The computer-readable storage medium of claim 1, wherein modifying the configuration of the virtual machine based at least in part on the determined configuration for the destination virtual machine comprises adjusting the configuration of the virtual machine to match the determined configuration using, at least in part, one-touch recovery techniques.

8. The computer-readable storage medium of claim 1 wherein a DNS table, routing table or similar data structure is updated with the IP address, so that the table points to the IP address of the destination virtual machine instead of pointing to a previous IP address associated with the source physical computing device.

9. A method for migrating functionality of a source physical computing device to a destination virtual machine, the method being performed by a processor executing instructions stored in a memory, the method comprising:
  determining a configuration of the source physical computing device;
  determining a configuration for a destination virtual machine based at least in part on the configuration of the source physical computing device;
  providing the destination virtual machine with access to data and metadata associated with the source physical computing device using a non-production copy of data associated with the source physical computing device, wherein the non-production copy is stored on one or more non-production storage media separate from the source physical computing device and separate from the destination virtual machine;
  establishing or initiating the destination virtual machine based on the determined configuration for the destination virtual machine and the provided access to the non-production copy of the data and metadata associated with the source physical computing device;
  following the establishing or initiating, updating a mapping of a logical address of the source physical computing device, the destination virtual machine, or both the source physical computing device and destination virtual machine,
    such that a client computing device is directed or routed to the destination virtual machine instead of the source physical computing device following the establishing or initiating, and
    such that, the source physical computing device is decommissionable after migration is complete, and wherein the source physical computing device is inoperable after being decommissioned; and
  disposing of the source physical computing device following decommissioning, including permanently wiping data and metadata stored on the source physical computing device, and notifying a server associated with an intranet site or auction site that the source physical computing device is available for use by other users in an organization or for sale to external parties, wherein the notification includes a description or specification of the source physical computing device.

10. The method of claim 9,
  wherein providing the destination virtual machine with access to data and metadata from the source physical computing device comprises mounting a point-in-time snapshot copy of data and metadata at the destination virtual machine.

11. The method of claim 9,
  wherein the non-production copy of data associated with the source physical computing device comprises an auxiliary backup copy of data associated with the source physical computing device,
  wherein the auxiliary backup copy is created using an existing backup copy of data associated with the source machine, and
  wherein the auxiliary copy is periodically or continuously updated to reflect ongoing changes to the existing backup copy of data associated with the source physical computing device.

12. The method of claim 9, wherein the non-production copy of data associated with the source physical computing device is created in accordance with an applicable information management policy, and wherein the same applicable information management policy is applied to the destination virtual machine.

13. The method of claim 9, wherein determining a configuration of the source physical computing device includes determining physical hardware resources available to the source physical computing device.

14. The method of claim 9, wherein providing the destination physical computing device access to data and metadata associated with the source physical computing device comprises providing access to only a limited subset of data and metadata from the source physical computing device in accordance with an applicable information management policy.

15. A system for migrating functionality of a source physical computing device to a destination virtual machine, the system comprising:
  at least one processor;
  memory coupled to the at least one processor;
  means for creating a non-production copy of data associated with a source physical computing device,
    wherein the non-production copy is stored on one or more non-production storage media separate from the source physical computing device and separate from the destination virtual machine;
  means for determining a configuration of the source physical computing device;
  means for determining a configuration for a destination virtual machine based at least in part on the configuration of the source physical computing device;
  means for providing the destination virtual machine access to data and metadata associated with the source physical computing device using the non-production copy of data associated with the source physical computing device;
  means for updating a mapping of a logical address of the source physical computing device, the destination virtual machine, or both the source physical computing device and destination virtual machine,
    such that a client computing device is directed or routed to the destination virtual machine instead of the source physical computing device following the establishing or initiating,
    such that, the source physical computing device is decommissionable after migration is complete, and wherein the source physical computing device is inoperable after being decommissioned; and
  means for disposing of the source physical computing device following decommissioning, including permanently wiping data and metadata stored on the source physical computing device, and notifying a server associated with an intranet site or auction site that the source physical computing device is available for use by other users in an organization or for sale to external parties, wherein the notification includes a description or specification of the source physical computing device.

16. The system of claim 15,
wherein the means for providing comprises means for mounting a point-in-time snapshot copy of data and metadata at the destination virtual machine.

17. The system of claim 15,
wherein the non-production copy of data associated with the source physical computing device comprises an auxiliary backup copy of data associated with the source physical computing device,
wherein the auxiliary backup copy is created using an existing backup copy of data associated with the source machine, and
wherein the auxiliary copy is periodically or continuously updated to reflect ongoing changes to the existing backup copy of data associated with the source physical computing device, and
wherein the non-production copy of data associated with the source physical computing device is created in accordance with an applicable information management policy.

18. The system of claim 15, further comprising means for selecting one copy from multiple non-production copies of data and metadata associated with a source physical computing device.

* * * * *